(12) United States Patent
Koizumi et al.

(10) Patent No.: US 10,787,331 B2
(45) Date of Patent: Sep. 29, 2020

(54) SHEET CONVEYING APPARATUS AND IMAGE FORMING APPARATUS

(71) Applicant: CANON KABUSHIKI KAISHA, Tokyo (JP)

(72) Inventors: Kazuhisa Koizumi, Abiko (JP); Kazuya Fukuda, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 15/980,624

(22) Filed: May 15, 2018

(65) Prior Publication Data
US 2018/0348690 A1 Dec. 6, 2018

(30) Foreign Application Priority Data

May 31, 2017 (JP) .................................. 2017-108244
Aug. 31, 2017 (JP) .................................. 2017-167248
Mar. 2, 2018 (JP) .................................. 2018-037686

(51) Int. Cl.
*B65H 7/02* (2006.01)
*B65H 5/06* (2006.01)
(Continued)

(52) U.S. Cl.
CPC .............. *B65H 7/02* (2013.01); *B65H 3/0669* (2013.01); *B65H 5/06* (2013.01); *B65H 5/062* (2013.01); *G03G 15/6529* (2013.01); *G03G 15/6558* (2013.01); *H04N 1/00602* (2013.01); *H04N 1/00652* (2013.01); *H04N 1/00745* (2013.01); *B65H 2404/14* (2013.01);
(Continued)

(58) Field of Classification Search
CPC ....... H02P 8/14; B65H 2515/704; B65H 3/06; B65H 5/06; B65H 7/02; B65H 7/06; B65H 2511/51
See application file for complete search history.

(56) References Cited

U.S. PATENT DOCUMENTS 7,397,212 B2 * 7/2008 Turner .................... H02P 23/14
318/561
7,521,884 B2 * 4/2009 Filippenko .............. H02J 9/066
318/400.06
(Continued)

FOREIGN PATENT DOCUMENTS

JP 2000147851 A 5/2000

*Primary Examiner* — Michael McCullough
(74) *Attorney, Agent, or Firm* — Canon U.S.A., Inc. I.P. Division

(57) ABSTRACT

A sheet conveying apparatus includes a second conveying roller adjoining a motor driven first conveying roller, a phase determiner to determine a rotational phase of a rotor of the motor, a controller, and a discriminator. The controller controls a drive current flowing through a winding of the motor to reduce phase deviation. The discriminator executes a discrimination regarding one of whether a front end of a sheet has reached a nip portion and whether a rear end of the sheet has passed through a nip portion. The controller controls such that the first conveying roller rotates at a first conveying roller peripheral velocity which is different from a peripheral velocity of the second conveying roller. The discriminator executes the discrimination based on a value of a parameter corresponding to a load torque applied to the rotor where the first conveying roller rotates at the first conveying roller peripheral velocity.

36 Claims, 20 Drawing Sheets

(51) Int. Cl.
  *H04N 1/00* (2006.01)
  *G03G 15/00* (2006.01)
  *B65H 3/06* (2006.01)
(52) U.S. Cl.
  CPC ...... *B65H 2511/51* (2013.01); *B65H 2515/70* (2013.01); *B65H 2515/704* (2013.01); *B65H 2557/2644* (2013.01)

(56) References Cited

U.S. PATENT DOCUMENTS

| | | | |
|---|---|---|---|
| 9,988,227 B2 * | 6/2018 | Kumagai | G03G 15/6567 |
| 10,224,846 B2 * | 3/2019 | Nito | B65H 5/062 |
| 10,252,872 B2 * | 4/2019 | Nishizawa | B65H 3/0669 |
| 10,547,263 B2 * | 1/2020 | Sato | H04N 1/00631 |
| 2018/0215565 A1 * | 8/2018 | Ota | G03G 15/6529 |
| 2019/0119058 A1 * | 4/2019 | Chiba | B65H 7/02 |

* cited by examiner

FIG.10

| PAPER TYPE | APPROPRIATE ΔV | \|Δθ\| IN CASE WHERE VELOCITY DIFFERENCE IS ΔV1 | \|Δθ\| IN CASE WHERE VELOCITY DIFFERENCE IS ΔV2 | \|Δθ\| IN CASE WHERE VELOCITY DIFFERENCE IS ΔV3 |
|---|---|---|---|---|
| THIN PAPER | ΔV1 | Δθ11 – Δθ12 | Δθ21 – Δθ22 | Δθ31 – Δθ32 |
| PLAIN PAPER | ΔV2 | Δθ12 – Δθ13 | Δθ22 – Δθ23 | Δθ32 – Δθ33 |
| THICK PAPER | ΔV3 | Δθ13 – Δθ14 | Δθ23 – Δθ24 | Δθ33 – Δθ34 |

SHEET CONVEYING APPARATUS AND IMAGE FORMING APPARATUS

BACKGROUND OF THE INVENTION

Field of the Invention

The present disclosure relates to the control of a motor in a sheet conveying apparatus and an image forming apparatus.

Description of the Related Art

Conventionally, a configuration that detects whether the rear end of a sheet has come out of (has passed through) a nip portion of the fixing rollers, based on a change in a load torque (a fluctuation in load) applied to a rotor of a motor for driving fixing rollers for fixing an image on the sheet in an image forming apparatus for forming the image on the sheet is known (see Japanese Patent Application Laid-Open No. 2000-147851).

In the Japanese Patent Application Laid-Open No. 2000-147851, if a range of the load fluctuation occurring in the motor for driving the fixing rollers when the rear end of the sheet comes out of the nip portion of the fixing rollers is small, it may not be possible to detect with high accuracy whether the rear end of the sheet has come out of the nip portion.

SUMMARY OF THE INVENTION

The present disclosure is directed to detecting with high accuracy a sheet that is conveyed.

According to an aspect of the present invention, a sheet conveying apparatus for conveying a sheet includes a first conveying roller configured to convey the sheet, a second conveying roller adjoining the first conveying roller, a motor configured to drive the first conveying roller, a phase determiner configured to determine a rotational phase of a rotor of the motor, a controller configured to control a drive current flowing through a winding of the motor such that a deviation between an instruction phase indicating a target phase of the rotor and the rotational phase determined by the phase determiner is reduced, and a discriminator configured to execute a discrimination with respect to at least one of whether a front end of the sheet has reached a nip portion of a downstream conveying roller which is on a downstream side of the first and second conveying rollers in a conveying direction in which the sheet is conveyed, and whether a rear end of the sheet has passed through a nip portion of an upstream conveying roller which is on an upstream side of the first and second conveying rollers in the conveying direction, wherein the controller controls the drive current flowing through the winding of the motor such that the first conveying roller rotates at a first conveying roller peripheral velocity which is different from a second conveying roller peripheral velocity of the second conveying roller, and wherein the discriminator executes the discrimination based on a value of a parameter corresponding to a load torque applied to the rotor in a state where the first conveying roller rotates at the first conveying roller peripheral velocity.

Further features of the present disclosure will become apparent from the following description of embodiments with reference to the attached drawings.

BRIEF DESCRIPTION OF THE DRAWINGS

FIG. 10 is a table illustrating relationships between a sheet type, and a peripheral velocity difference $\Delta V$ and a deviation $\Delta\theta$.

DESCRIPTION OF THE EMBODIMENTS

With reference to the drawings, suitable embodiments of the present disclosure will be described below. However, the shapes of components and the relative arrangement of the components described in these embodiments should be appropriately changed depending on the configuration of an apparatus to which the present disclosure is applied and various conditions, and the scope of the present disclosure are not limited to the following embodiments. In the following descriptions, a case is described where a motor control device is provided in an image forming apparatus. The motor control device, however, is provided not only in the image forming apparatus. For example, the motor control device is also used in a sheet conveying apparatus for conveying a sheet such as a document or a recording medium.

[Image Forming Apparatus]

Figure 1:
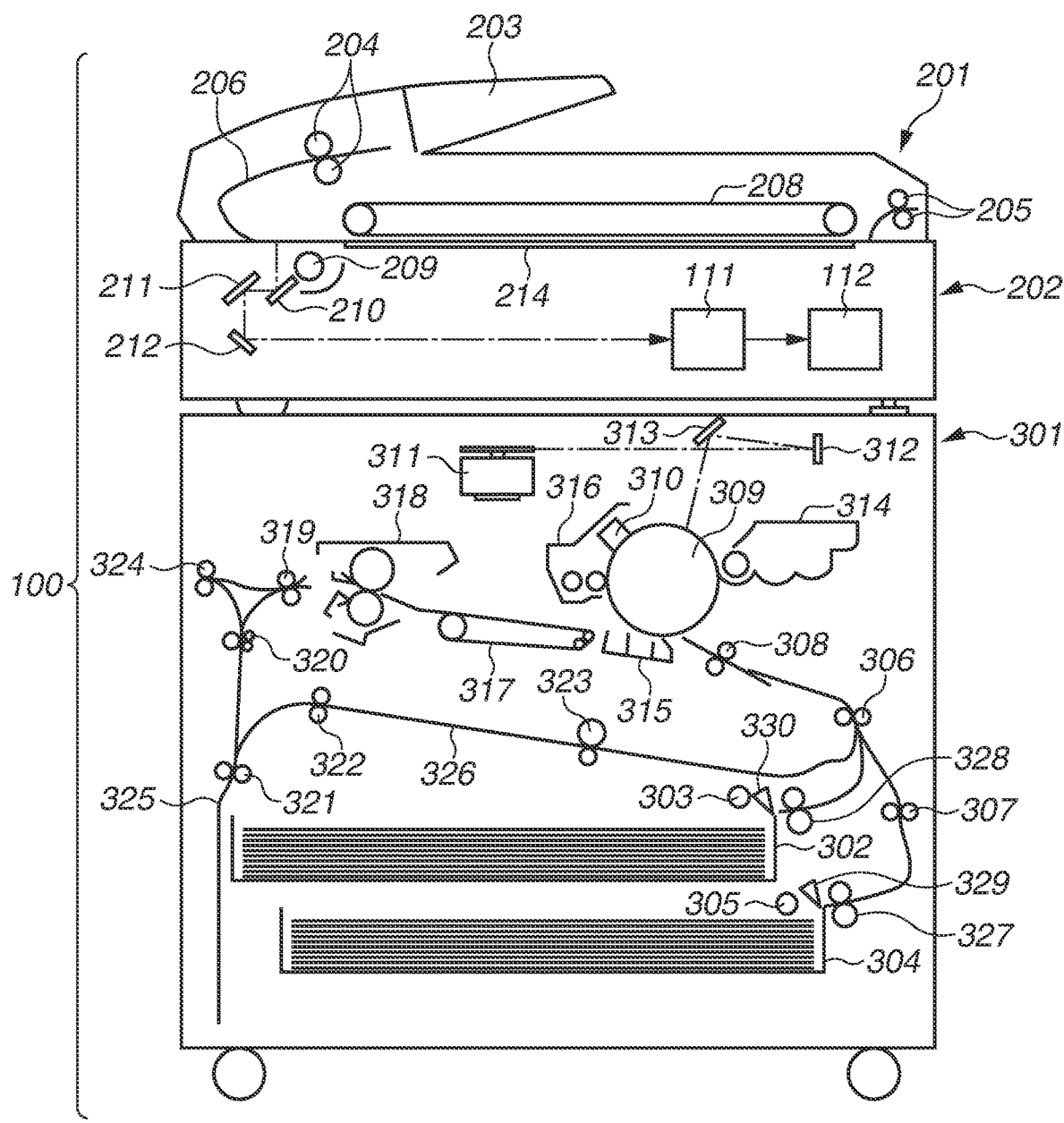
FIG. 1 is a cross-sectional view illustrating an image forming apparatus according to a first embodiment.

A first embodiment is described below. FIG. 1 is a cross-sectional view illustrating the configuration of a monochrome electrophotographic copying machine (hereinafter referred to as "image forming apparatus") 100, which includes a sheet conveying apparatus used in the present embodiment. The image forming apparatus 100 is not limited to a copying machine, and may be applied, for example, to a facsimile apparatus, a printing machine, or a printer. Further, a recording method is not limited to an electrophotographic method, and may be used, for example, for an ink-jet method. Further, the format of the image forming apparatus 100 may be either monochrome or color formats.

With reference to FIG. 1, configuration and function of the image forming apparatus 100 are described below. As illustrated in FIG. 1, the image forming apparatus 100 includes a document feeding apparatus 201, a reading apparatus 202, and an image printing apparatus 301.

Documents stacked in a document stacking unit 203 of the document feeding apparatus 201 are fed one by one by feed roller 204, and each document is conveyed along a conveyance guide 206 onto a document glass platen 214 of the reading apparatus 202. Further, the document is conveyed at a constant velocity by a conveying belt 208 and discharged to a sheet discharge tray (not illustrated) by sheet discharge roller 205. Light reflected from an image of the document illuminated by an illumination system 209 at a reading position of the reading apparatus 202 is guided to an image reading unit 111 by an optical system including reflecting mirrors 210, 211, and 212 and is converted into an image signal by the image reading unit 111. The image reading unit 111 includes a lens, a charge-coupled device (CCD), which is a photoelectric conversion element, and a driving circuit for the CCD. The image signal output from the image reading unit 111 is subjected to various correction processes by an image processing unit 112, which includes a hardware device such as an application-specific integrated circuit (ASIC). Then, the resulting image signal is output to the image printing apparatus 301. In the way as described above, document reading is carried out. That is, the document feeding apparatus 201 and the reading apparatus 202 function as a document reading apparatus.

Further, document reading modes include a first reading mode and a second reading mode. In the first reading mode, the illumination system 209 and the optical system fixed at predetermined positions read an image of a document conveyed at a constant velocity. In the second reading mode, the illumination system 209 and the optical system moving at a constant velocity read an image of a document placed on the document glass 214 of the reading apparatus 202. Normally, an image of a sheet-like document is read in the first reading mode, and an image of a bound document such as a book or a booklet is read in the second reading mode.

Sheet storage trays 302 and 304 are provided within the image printing apparatus 301. In the sheet storage trays 302 and 304, different types of recording media can be stored. For example, A4-size plain paper is stored in the sheet storage tray 302, and A4-size thick paper is stored in the sheet storage tray 304. On the recording media, an image is formed by the image forming apparatus 100. For example, the recording media include a sheet, a resin sheet, cloth, an overhead projector (OHP) sheet, and a label.

As illustrated in FIG. 1, in the present embodiment, between a pickup roller 305 and feed roller 327 which convey a sheet fed by the pickup roller 305 in a conveying direction, a sheet sensor 329 which detects the sheet is provided. Further, between a pickup roller 303 and feed roller 328 which convey a sheet fed by the pickup roller 303 in a conveying direction, a sheet sensor 330 which detects the sheet is provided.

A recording medium stored in the sheet storage tray 302 is fed by the pickup roller 303 and sent out to registration roller 308 by the feed roller 328 and conveying roller 306. Further, a recording medium stored in the sheet storage tray 304 is fed by the pickup roller 305 and sent out to the registration roller 308 by the feed roller 327, conveying roller 307, and the conveying roller 306.

The image signal output from the reading apparatus 202 is input to an optical scanning device 311, which includes a semiconductor laser and a polygon mirror. In addition, the outer peripheral surface of a photosensitive drum 309 is charged by a charging device 310. After the outer peripheral surface of the photosensitive drum 309 is charged, laser light according to the image signal input from the reading apparatus 202 to the optical scanning device 311 is emitted from the optical scanning device 311 to the outer peripheral surface of the photosensitive drum 309 via the polygon mirror and mirrors 312 and 313. Consequently, an electrostatic latent image is formed on the outer peripheral surface of the photosensitive drum 309.

Next, the electrostatic latent image is developed with toner in a developing device 314, thereby forming a toner image on the outer peripheral surface of the photosensitive drum 309. The toner image formed on the photosensitive drum 309 is transferred onto a recording medium by a transfer charging device 315, which is provided at a position (a transfer position) opposed to the photosensitive drum 309. At this transfer timing, the registration roller 308 send the recording medium into the transfer position.

As described above, the recording medium onto which the toner image has been transferred is sent into a fixing device 318 by a conveying belt 317 and is heated and pressed by the fixing device 318, thereby fixing the toner image to the recording medium. In this manner, an image is formed on the recording medium by the image forming apparatus 100.

In a case where an image is formed in a one-sided printing mode, the recording medium having passed through the fixing device 318 is discharged to a sheet discharge tray (not illustrated) by sheet discharge roller 319 and 324. Further, in a case where an image is formed in a two-sided printing mode, a fixing process is performed on a first surface of the recording medium by the fixing device 318, and then, the recording medium is conveyed to a reverse path 325 by the sheet discharge roller 319, conveying roller 320, and reverse roller 321. Then, the recording medium is conveyed to the registration roller 308 again by conveying roller 322 and 323, and an image is formed on a second surface of the recording medium by the above method. Then, the recording medium is discharged to the sheet discharge tray (not illustrated) by the sheet discharge roller 319 and 324.

Further, in a case where the recording medium with an image formed on the first surface, is discharged face-down to the outside of the image forming apparatus 100, the recording medium having passed through the fixing device 318 is conveyed through the sheet discharge roller 319 in a direction toward the conveying roller 320. Then, immediately before the rear end of the recording medium passes through a nip portion of the conveying roller 320, the rotation of the conveying roller 320 is reversed, thereby discharging the recording medium to the outside of the image forming apparatus 100 via the sheet discharge roller 324 with the first surface of the recording medium facing down.

The above is the description of the configuration and the function of the image forming apparatus 100.

Figure 2:
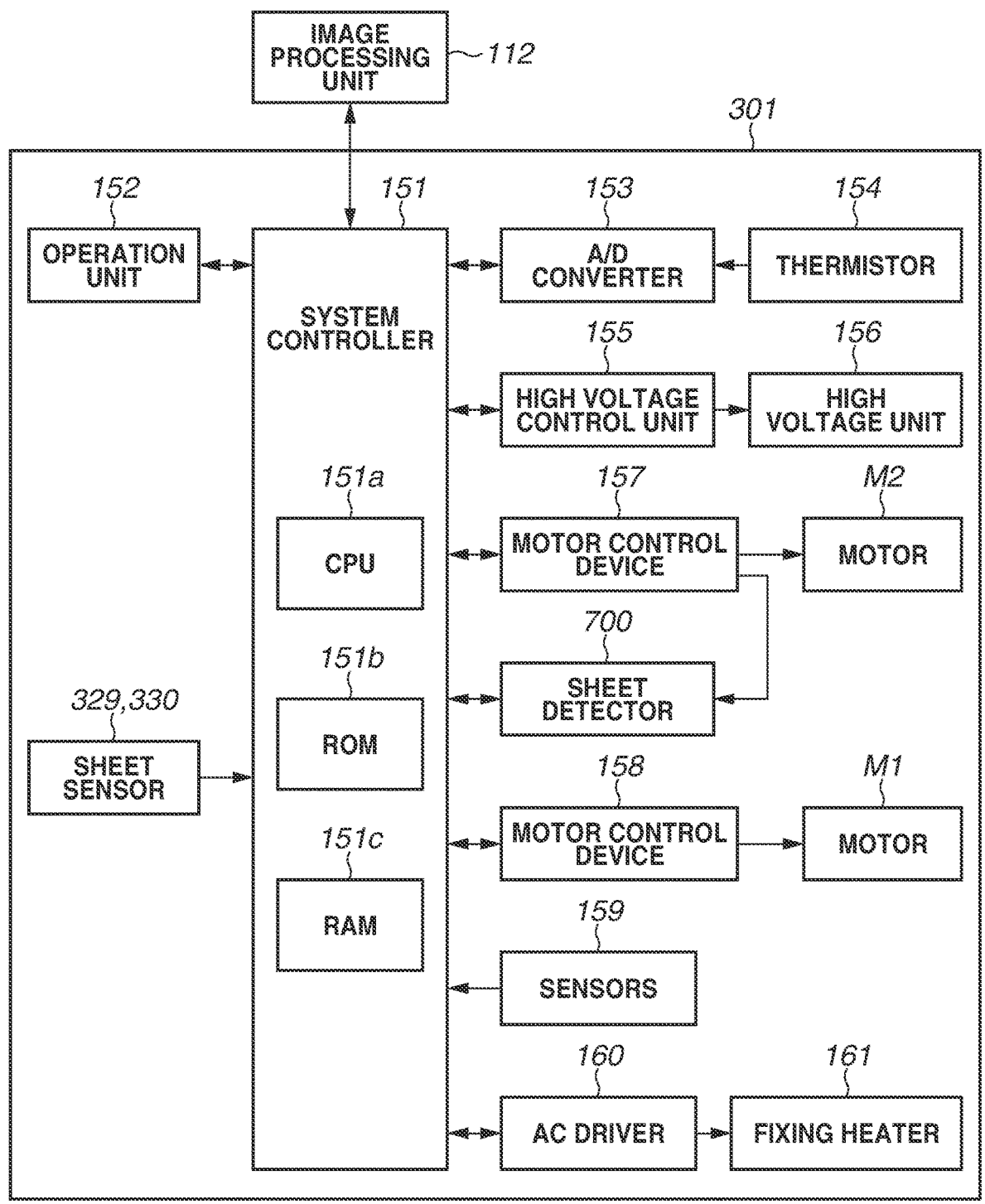
FIG. 2 is a block diagram illustrating a control configuration of the image forming apparatus according to the first embodiment.

FIG. 2 is a block diagram illustrating an example of the control configuration of the image forming apparatus 100. As illustrated in FIG. 2, a system controller 151 includes a central processing unit (CPU) 151a, a read-only memory (ROM) 151b, and a random-access memory (RAM) 151c. The system controller 151 is connected to an image processing unit 112, an operation unit 152, an analog-to-digital (A/D) converter 153, a high voltage control unit 155, motor control devices 157 and 158, sensors 159, an alternating current (AC) driver 160, the sheet sensors 329 and 330, and a sheet detector 700. The system controller 151 can transmit and receive data and a command to and from the units connected to the system controller 151.

The CPU 151a reads and executes various programs stored in the ROM 151b, thereby executing various sequences related to an image forming sequence determined in advance.

The RAM 151c is a storage device. The RAM 151c stores various types of data such as a setting value for the high voltage control unit 155, an instruction value for the motor control device 157, and information received from the operation unit 152.

The system controller 151 transmits setting value data required for image processing by the image processing unit 112 with respect to the various devices provided within the image forming apparatus 100, to the image processing unit 112. Further, the system controller 151 receives signals from the sensors 159, and based on the received signals, sets a setting value of the high voltage control unit 155. According to the setting value set by the system controller 151, the high voltage control unit 155 supplies a required voltage to a high voltage unit 156 (the charging device 310, the developing device 314, and the transfer charging device 315).

According to an instruction output from the CPU 151a, the motor control device 157 controls a motor M2 for driving the conveying roller 306. Further, according to an instruction output from the CPU 151a, the motor control device 158 controls a motor M1 for driving the conveying roller 307. In FIG. 2, only the motors M1 and M2 are illustrated as motors of the image forming apparatus 100. Actually, however, a plurality of motors are provided in the image forming apparatus 100. Alternatively, the configuration may be set up such that a single motor control device controls a plurality of motors. Further, although only two motor control devices are provided in FIG. 2, three or more motor control devices may be provided in the image forming apparatus 100.

The A/D converter 153 receives a signal detected by a thermistor 154 that detects the temperature of a fixing heater 161. Then, the A/D converter 153 converts the detected signal from an analog signal to a digital signal and transmits the digital signal to the system controller 151. Based on the digital signal received from the A/D converter 153, the system controller 151 controls the AC driver 160. The AC driver 160 controls the fixing heater 161 such that the temperature of the fixing heater 161 becomes a temperature required to perform a fixing process. The fixing heater 161 is a heater for use in the fixing process and is included in the fixing device 318.

The system controller 151 controls the operation unit 152 to display, on a display unit provided in the operation unit 152, an operation screen for a user to set the type of a recording medium to be used (hereinafter referred to as the "sheet type"). The system controller 151 receives information set by the user from the operation unit 152, and based on the information set by the user, controls the operation sequence of the image forming apparatus 100. Further, the system controller 151 transmits information indicating the state of the image forming apparatus 100 to the operation unit 152. The information indicating the state of the image forming apparatus 100 is, for example, related to the number of images to be formed, progress of an image forming operation, and a jam or multi-feed of a sheet material in the document reading apparatus 201 and the image printing apparatus 301. The operation unit 152 displays on the display unit the information received from the system controller 151.

As described above, the system controller 151 controls the operation sequence of the image forming apparatus 100. The sheet detector 700 will be described below.

[Motor Control Device]

Next, a motor control device according to the present embodiment is described. The motor control device according to the present embodiment controls a motor using vector control.

<Vector Control>

Figure 3:
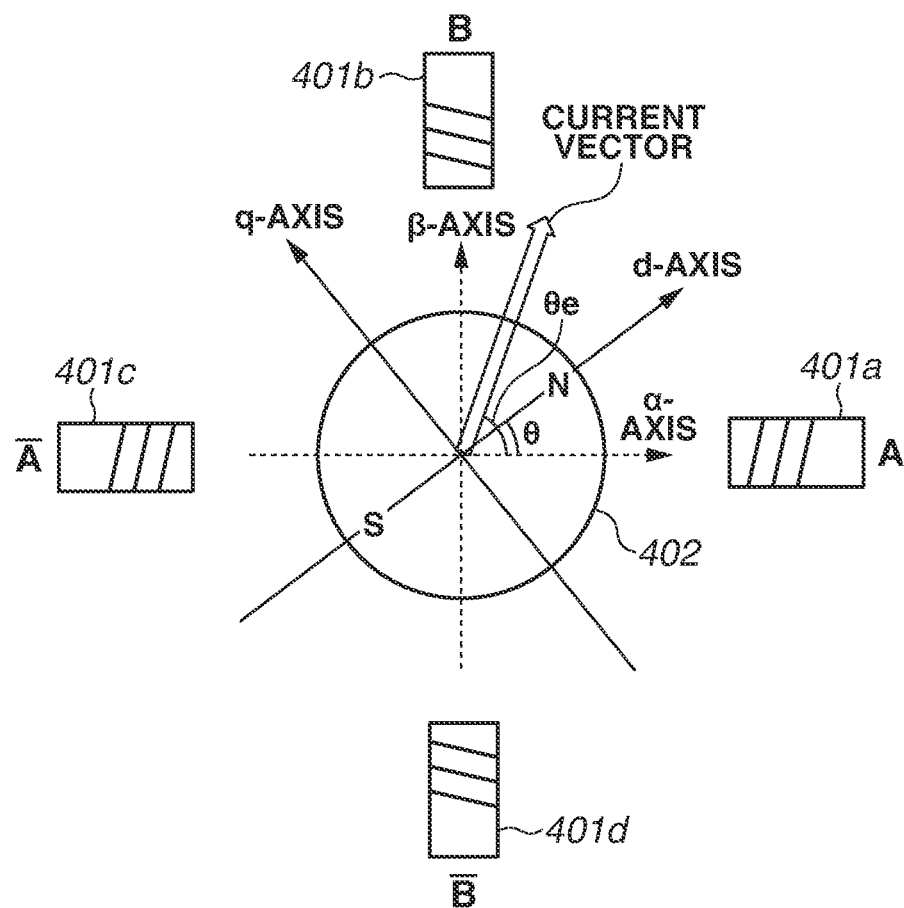
FIG. 3 is a diagram illustrating a relationship between a two-phase motor including an A-phase and a B-phase, and a rotating coordinate system represented by a d-axis and a q-axis.
Figure 4:
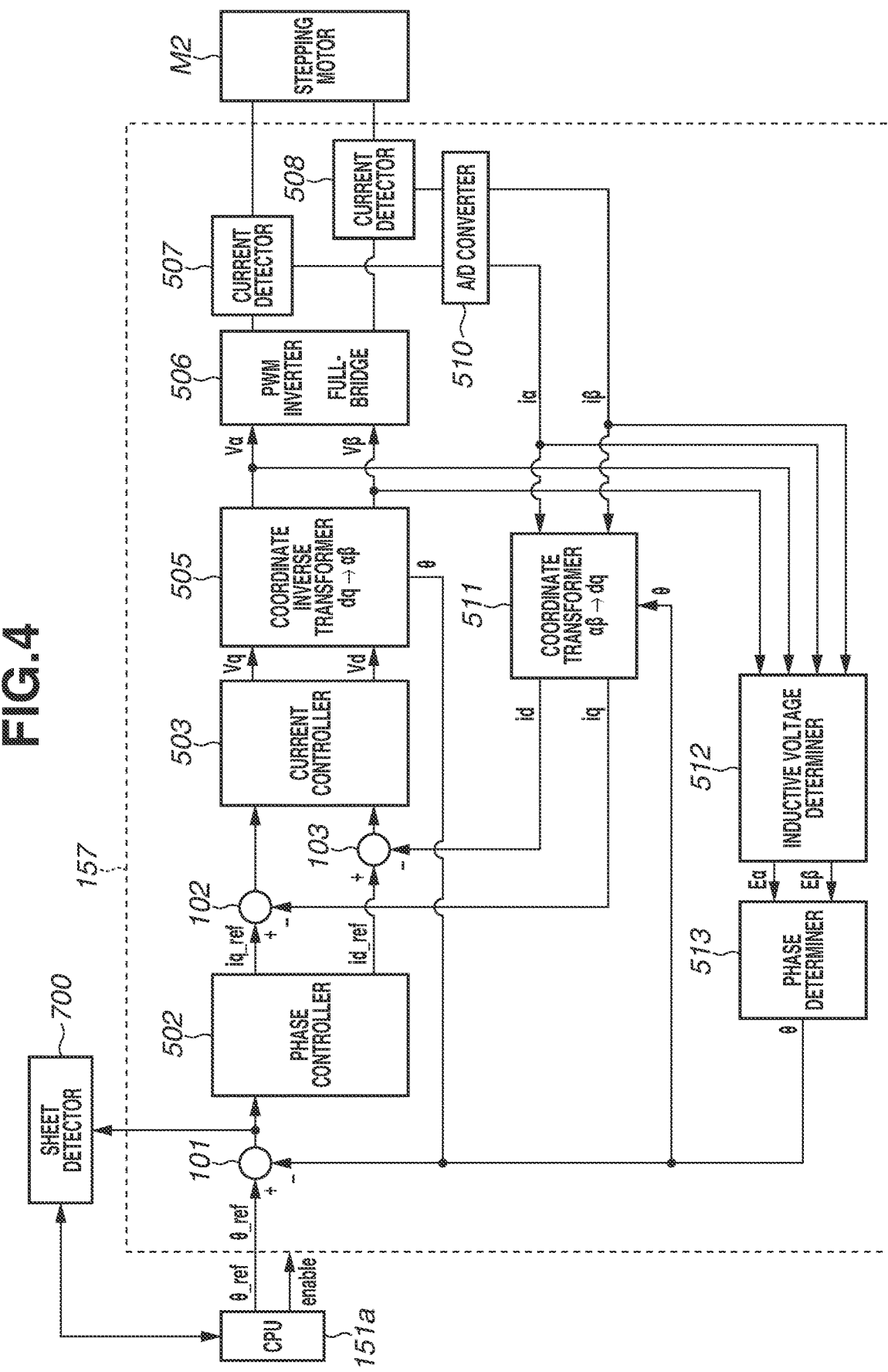
FIG. 4 is a block diagram illustrating a configuration of a motor control device according to the first embodiment.

First, with reference to FIGS. 3 and 4, a description is given of a method by which the motor control device 157 performs vector control, according to the present embodiment. The configuration of the motor control device 158 is similar to that of the motor control device 157, and therefore is not described here. Further, in a motor in the following description, a sensor such as a rotary encoder for detecting the rotational phase of a rotor of the motor is not provided. However, a sensor such as a rotary encoder may be provided in the motor.

FIG. 3 is a diagram illustrating the relationship between the stepping motor (hereinafter referred to as "motor") M2, which has two phases including an A-phase (a first phase) and a B-phase (a second phase), and a rotating coordinate system represented by a d-axis and a q-axis. In FIG. 3, in a stationary coordinate system, an α-axis, which is an axis corresponding to windings in the A-phase, and a β-axis, which is an axis corresponding to windings in the B-phase, are defined. Further, in FIG. 3, the d-axis is defined along the direction of magnetic flux generated by the magnetic poles of a permanent magnet used in a rotor 402, and the q-axis is defined along a direction rotated 90 degrees counterclockwise from the d-axis (a direction orthogonal to the d-axis). The angle between the α-axis and the d-axis is defined as θ, and the rotational phase of the rotor 402 is represented by an angle θ. In the vector control, a rotating coordinate system based on the rotational phase θ of the rotor 402 is used. More specifically, in the vector control, a q-axis component (a torque current component) and a d-axis component (an excitation current component), which are current components in the rotating coordinate system of a current vector corresponding to a drive current flowing through each winding, are used. The q-axis component (the torque current component) generates a torque in the rotor 402, and the d-axis component (the excitation current component) influences the strength of magnetic flux passing through the winding.

The vector control is a method for controlling a motor by performing phase feedback control for controlling the value of a torque current component and the value of an excitation current component so that the deviation between an instruction phase indicating a target phase of a rotor and an actual rotational phase of the rotor is reduced. Further, there is also a method for controlling a motor by performing velocity feedback control for controlling the value of a torque current component and the value of an excitation current component so that the deviation between an instruction velocity indicating a target velocity of a rotor and an actual rotational velocity of the rotor is reduced.

FIG. 4 is a block diagram illustrating an example of the configuration of the motor control device 157, which controls the motor M2. The motor control device 157 includes at least one ASIC and executes functions described below.

As illustrated in FIG. 4, the motor control device 157 includes, as a circuit for performing the vector control, a phase controller 502, a current controller 503, a coordinate inverter 505, a coordinate converter 511, and a pulse-width modulation (PWM) inverter 506 which supplies drive currents to the windings of the motor M2. The coordinate converter 511 converts the coordinate system of the current vectors corresponding to drive currents flowing through the windings in the A-phase and the B-phase of the motor M2, from the stationary coordinate system represented by the α-axis and the β-axis to the rotating coordinate system represented by the q-axis and the d-axis. Consequently, the drive currents flowing through the windings are represented by the current value of the q-axis component (a q-axis current) and the current value of the d-axis component (a d-axis current), which are current values in the rotating coordinate system. The q-axis current corresponds to a torque current for generating a torque in the rotor 402 of the motor M2. Further, the d-axis current corresponds to an excitation current that influences the strength of magnetic flux passing through each winding of the motor M2. The motor control device 157 can independently control the q-axis current and the d-axis current. Consequently, the motor control device 157 controls the q-axis current according to a load torque applied to the rotor 402 and thereby can efficiently generate a torque required for the rotation of the rotor 402. That is, in the vector control, the magnitude of the current vector illustrated in FIG. 3 changes according to the load torque applied to the rotor 402.

The motor control device 157 determines the rotational phase θ of the rotor 402 of the motor M2 by a method described below, and based on the determination result, performs the vector control. The CPU 151a generates an instruction phase θ_ref indicating a target phase of the rotor 402 of the motor M2. Then, the CPU 151a outputs the instruction phase θ_ref to the motor control device 157. The instruction phase θ_ref is set based on a target velocity of the rotor 402 of the motor M2 corresponding to a target velocity of the peripheral velocity of the conveying roller 306.

A subtractor 101 calculates a deviation Δθ between the rotational phase θ of the rotor 402 of the motor M2, which is output from a phase determiner 513, and the instruction phase θ_ref. Then, the subtractor 101 outputs the deviation Δθ.

The phase controller 502 acquires the deviation Δθ in a cycle T (e.g., 200 μs). Based on proportional control (P), integral control (I), and differential control (D), the phase controller 502 generates a q-axis current instruction value iq_ref and a d-axis current instruction value id_ref so that the deviation Δθ output from the subtractor 101 is reduced. Then, the phase controller 502 outputs the q-axis current instruction value iq_ref and the d-axis current instruction value id_ref. Specifically, based on P-control, I-control, and D-control, the phase controller 502 generates the q-axis current instruction value iq_ref and the d-axis current instruction value id_ref so that the deviation Δθ output from the subtractor 101 becomes 0. Then, the phase controller 502 outputs the q-axis current instruction value iq_ref and the d-axis current instruction value id_ref. P-control is a method for controlling the value of a target to be controlled based on a value proportional to the deviation between an instruction value and an estimated value. Further, I-control is a method for controlling the value of the target to be controlled based on a value proportional to the time integral of the deviation between the instruction value and the estimated value. Further, D-control is a method for controlling the value of the target to be controlled based on a value proportional to a temporal change of the deviation between the instruction value and the estimated value. The phase controller 502 according to the present embodiment generates the q-axis current instruction value iq_ref and the d-axis current instruction value id_ref based on proportional-integral-differential (PID) control. The present disclosure, however, is not limited thereto. For example, the phase controller 502 may generate the q-axis current instruction value iq_ref and the d-axis current instruction value id_ref based on proportional-integral (PI) control. In a case where a permanent magnet is used in the rotor 402, the d-axis current instruction value id_ref, which influences the strength of magnetic flux passing through each winding, is normally set to 0. The present disclosure, however, is not limited thereto.

Drive currents flowing through the windings in the A-phase and the B-phase of the motor M2 are detected by current detectors 507 and 508 and then converted from analog values to digital values by an A/D converter 510. The cycle of the current detectors 507 and 508 for detecting the currents is, for example, a cycle (e.g., 25 μs) less than or equal to the cycle T, in which the phase controller 502 acquires the deviation Δθ.

The current values of the drive currents converted from the analog values to the digital values by the A/D converter 510 are represented as current values iα and iβ in the stationary coordinate system by the following formulas, using a phase θe of the current vector illustrated in FIG. 3. The phase θe of the current vector is defined as the angle between the α-axis and the current vector. Further, I represents the magnitude of the current vector.

$$i\alpha = I^* \cos \theta e \quad (1)$$

$$i\beta = I^* \sin \theta e \quad (2)$$

The current values iα and iβ are input to the coordinate converter 511 and an inductive voltage determiner 512.

The coordinate converter 511 converts the current values iα and iβ in the stationary coordinate system into a current value iq of the q-axis current and a current value id of the d-axis current in the rotating coordinate system by the following formulas.

$$id = \cos \theta^* i\alpha + \sin \theta^* i\beta \quad (3)$$

$$iq = -\sin \theta^* i\alpha + \cos \theta^* i\beta \quad (4)$$

The coordinate converter 511 outputs the converted current value iq to a subtractor 102. Further, the coordinate converter 511 outputs the converted current value id to a subtractor 103.

The subtractor 102 calculates the deviation between the q-axis current instruction value iq_ref and the current value iq and outputs the calculated deviation to the current controller 503.

Further, the subtractor 103 calculates the deviation between the d-axis current instruction value id_ref and the current value id and outputs the calculated deviation to the current controller 503.

Based on PID control, the current controller 503 generates drive voltages Vq and Vd so that each of the deviations input to the current controller 503 is reduced. More specifically, the current controller 503 generates the drive voltages Vq and Vd so that each of the deviations input to the current controller 503 becomes 0. Then, the current controller 503 outputs the drive voltages Vq and Vd to the coordinate inverter 505. That is, the current controller 503 functions as a generation unit. The current controller 503 according to the present embodiment generates the drive voltages Vq and Vd based on PID control. The present disclosure, however, is not limited thereto. For example, the current controller 503 may generate the drive voltages Vq and Vd based on PI control.

The coordinate inverter 505 inversely converts the drive voltages Vq and Vd in the rotating coordinate system, which are output from the current controller 503, into drive voltages Vα and Vβ in the stationary coordinate system by the following formulas.

$$V\alpha = \cos\theta * Vd - \sin\theta * Vq \quad (5)$$

$$V\beta = \sin\theta * Vd + \cos\theta * Vq \quad (6)$$

The coordinate inverter 505 outputs the inversely converted drive voltages Vα and Vβ to the inductive voltage determiner 512 and the PWM inverter 506.

The PWM inverter 506 includes a full-bridge circuit. The full-bridge circuit is driven by PWM signals based on the drive voltages Vα and Vβ input from the coordinate inverter 505. As a result, the PWM inverter 506 generates drive currents iα and iβ according to the drive voltages Vα and Vβ and supplies the drive currents iα and iβ to the windings of the respective phases of the motor M2, thereby driving the motor M2. That is, the PWM inverter 506 functions as a unit for supplying currents to the windings of the respective phases of the motor M2. In the present embodiment, the PWM inverter 506 includes a full-bridge circuit. However, the PWM inverter 506 may include a half-bridge circuit.

Next, a description is given of a determination method for determining the rotational phase θ. The rotational phase θ of the rotor 402 is determined using the values of inductive voltages Eα and Eβ induced in the windings of the A-phase and the B-phase of the motor M2 by the rotation of the rotor 402. The value of each inductive voltage is determined (calculated) by the inductive voltage determiner 512. More specifically, the inductive voltages Eα and Eβ are determined by the following formulas, based on the current values iα and iβ input from the A/D converter 510 to the inductive voltage determiner 512 and the drive voltages Vα and Vβ input from the coordinate inverter 505 to the inductive voltage determiner 512.

$$E\alpha = V\alpha - R * i\alpha - L * di\alpha/dt \quad (7)$$

$$E\beta = V\beta - R * i\beta - L * di\beta/dt \quad (8)$$

In these formulas, R represents resistance of the winding, and L represents inductance of the winding. The values of the resistance R and the inductance L are values specific to the motor M2 in use and are stored in advance in the ROM 151b or a memory (not illustrated) provided in the motor control device 157.

The inductive voltages Eα and Eβ determined by the inductive voltage determiner 512 are output to the phase determiner 513.

Based on the ratio between the inductive voltages Eα and Eβ output from the inductive voltage determiner 512, the phase determiner 513 determines the rotational phase θ of the rotor 402 of the motor M2 by the following formula.

$$\theta = \tan^{-1}(-E\beta/E\alpha) \quad (9)$$

In the present embodiment, the phase determiner 513 determines the rotational phase θ by performing calculation based on formula (9). The present disclosure, however, is not limited thereto. For example, the phase determiner 513 may determine the rotational phase θ by referencing a table stored in the ROM 151b, which shows the relationships between the inductive voltages Eα and Eβ, and the rotational phase θ corresponding to the inductive voltages Eα and Eβ.

The rotational phase θ of the rotor 402 obtained as described above is input to the subtractor 101, the coordinate inverter 505, and the coordinate converter 511.

The motor control device 157 repeatedly performs the above control.

As described above, the motor control device 157 according to the present embodiment performs the vector control for controlling current values in the rotating coordinate system so that the deviation between the instruction phase θ_ref and the rotational phase θ is reduced. By performing the vector control, it is possible to prevent a motor from entering a step-out state, the motor sound from increasing due to an excess torque, and power consumption from increasing.

[Drive Configuration of Conveying Roller]

Figure 5:
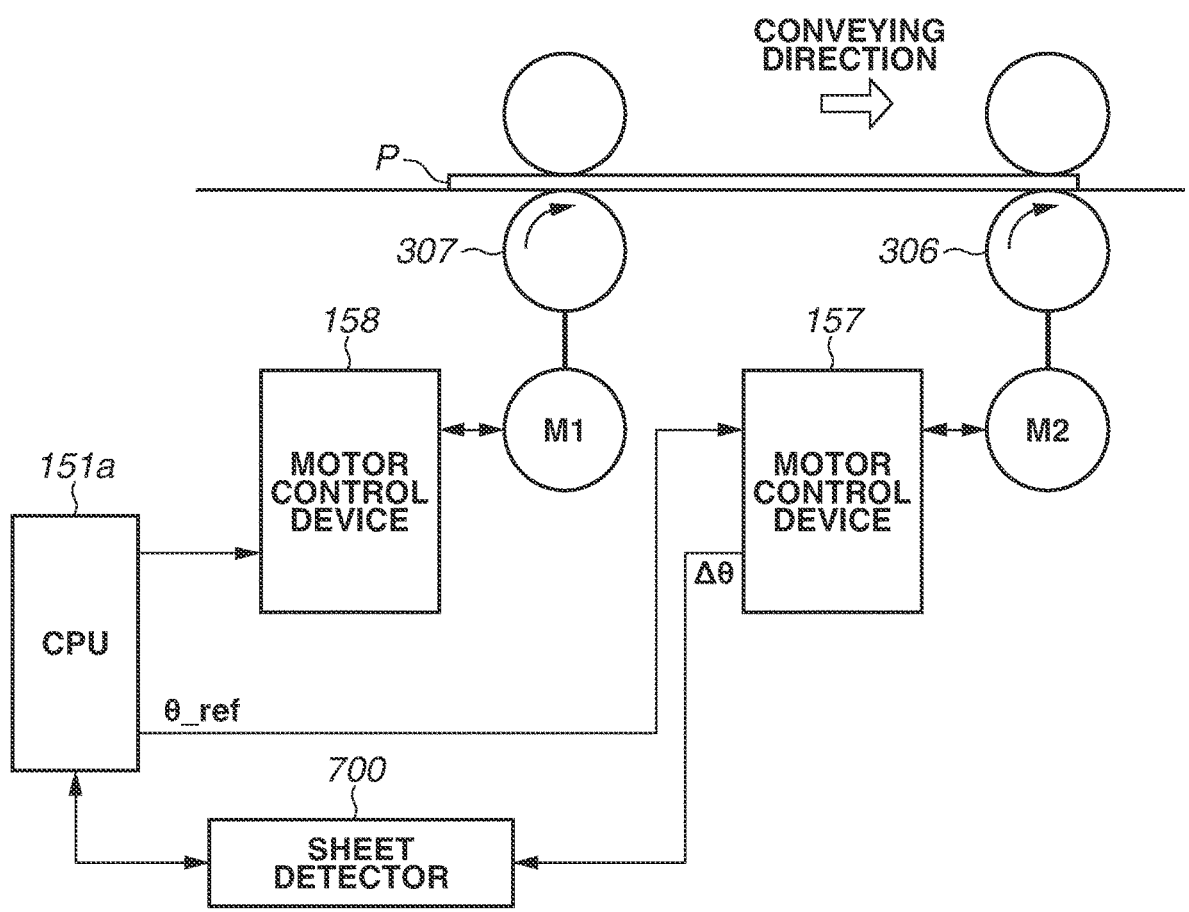
FIG. 5 is a diagram illustrating a configuration in which conveying roller are driven, according to the first embodiment.

FIG. 5 is a diagram illustrating a configuration in which conveying roller is driven, according to the present embodiment. As illustrated in FIG. 5, the conveying roller 307 is driven by the motor M1, and the motor M1 is controlled by the motor control device 158. Further, the conveying roller 306 is driven by the motor M2, and the motor M2 is controlled by the motor control device 157.

The drive configuration of the conveying roller 306 and 307 are described below. In the following description, the motor control devices 157 and 158 perform phase feedback control based on the instruction phase θ_ref output from the CPU 151a. The instruction phase θ_ref is generated by the CPU 151a based on target velocities of the motors M1 and M2. The CPU 151a outputs, for example, a pulse signal to each of the motor control devices 157 and 158. The number of pulses corresponds to an instruction phase, and the frequency of pulses corresponds to a target velocity. Further, the target velocity is determined based on a target value of the peripheral velocity of roller.

Figure 6A:
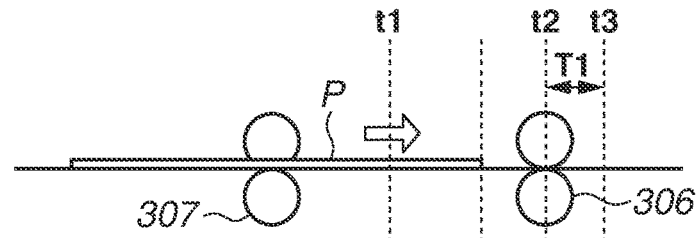
FIGS. 6A, 6B, and 6C are a time chart illustrating peripheral velocities of the conveying roller.
Figure 6B:
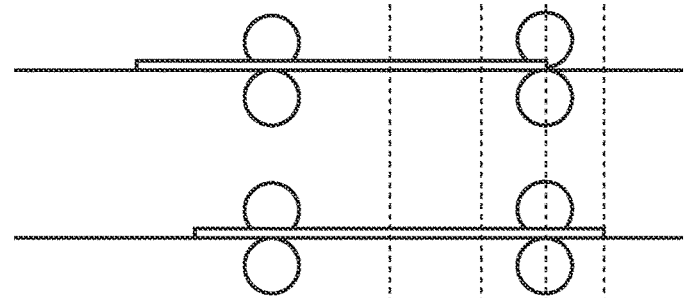
Figure 6C:
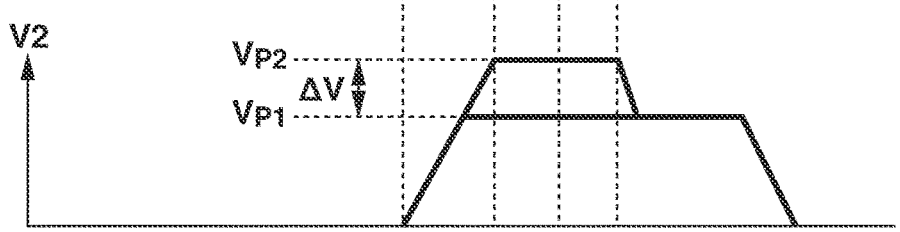

FIGS. 6A to 6C are a time chart illustrating the peripheral velocity of the conveying roller 307 and the peripheral velocity of the conveying roller 306. FIG. 6A is a diagram illustrating the relationships between a sheet P and the conveying roller 306 and 307. Further, FIG. 6B is a diagram illustrating a peripheral velocity V1 of the conveying roller 307. Further, FIG. 6C is a diagram illustrating a peripheral velocity V2 of the conveying roller 306.

As illustrated in FIGS. 6A to 6C, in the present embodiment, the motor M1 is controlled such that the peripheral velocity V1 of the conveying roller 307 becomes VP1. Then, a sheet is conveyed by the conveying roller 307 rotating at the peripheral velocity VP1. Further, at a time t1 when the front end of the sheet that is being conveyed by the conveying roller 307 rotating at the peripheral velocity VP1 reaches a predetermined position upstream of a nip portion of the conveying roller 306, the CPU 151a starts the driving of the conveying roller 306. More specifically, at the time t1, the CPU 151a controls the motor M2 such that the peripheral velocity V2 of the conveying roller 306 becomes VP2. The peripheral velocity VP1 of the conveying roller 307 is a velocity at which the sheet is conveyed. The peripheral velocity VP1 is stored in advance in the ROM 151$b$. Further, the peripheral velocity V2 of the conveying roller 306 is set to the peripheral velocity VP2, which is greater by $\Delta V$ than the peripheral velocity VP1. That is, the conveying roller 306 rotate at a peripheral velocity greater than the conveying roller 307 by $\Delta V$. The difference $\Delta V$ in peripheral velocity is set to a difference such that even if the conveying roller 306 slips on the surface of the sheet conveyed by the conveying roller 307 rotating at the peripheral velocity VP1, the sheet is not damaged. Further, in the present embodiment, for example, the difference $\Delta V$ in peripheral velocity in a case where the type of the sheet to be conveyed is thick paper, is the same as that in a case where the type of the sheet to be conveyed is thin paper. However, the difference in peripheral velocity $\Delta V$ may be set differently according to the type of the sheet to be conveyed.

As described above, the peripheral velocity of the conveying roller 306 is set to a velocity greater than that of the conveying roller 307, so that the accuracy of detecting the sheet is refined as compared with a case where the conveying roller 306 and 307 rotate at the same peripheral velocity, as will be described below. The time t1 when the driving of the conveying roller 306 is started, is set such that the peripheral velocity of the conveying roller 306 reaches VP2 by the time when the front end of the sheet being conveyed by the conveying roller 307 reaches the nip portion of the conveying roller 306.

[Sheet Detector]

Next, a description is given of a configuration in which the sheet detector 700 detects whether the front end of the sheet has reached (is nipped by) the nip portion of the conveying roller 306. In the present embodiment, instead of a sensor such as a photosensor, it is detected (determined) based on a signal output from the motor control device 157 whether the front end of the sheet has reached the nip portion of the conveying roller 306. In the following description, for example, the sheet detector 700 outputs the determination result (the detection result) in a predetermined time cycle (e.g., a cycle that the deviation $\Delta \theta$ is input).

Figure 7:
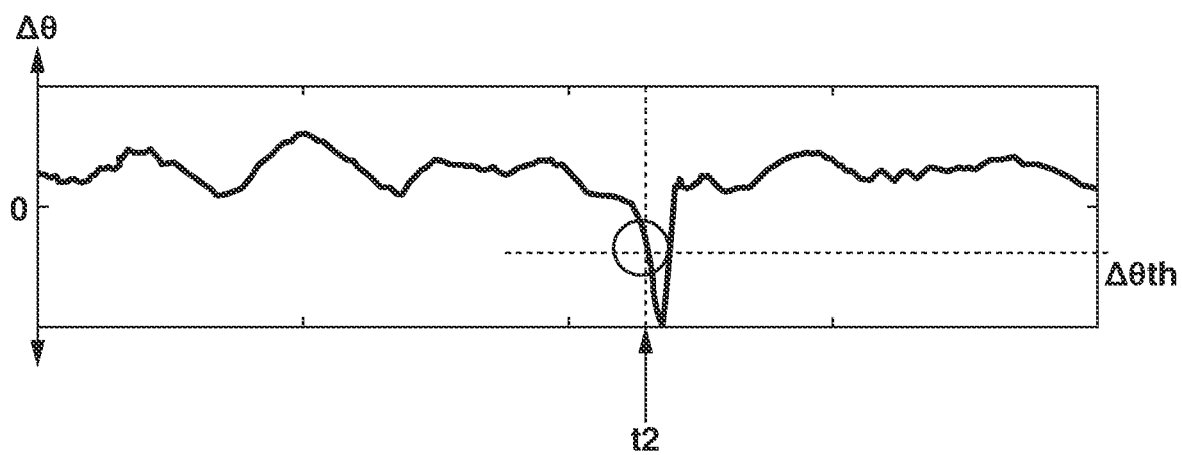
FIG. 7 is a diagram illustrating a deviation $\Delta\theta$ between an instruction phase $\theta\_ref$ of a motor for driving conveying roller on a downstream side and an actual rotational phase $\theta$ of a rotor.

FIG. 7 is a diagram illustrating the deviation $\Delta \theta$ output from the motor control device 157, which controls the motor M2 for driving the conveying roller 306. In FIG. 7, the deviation $\Delta \theta$ having a negative value indicates that the rotational phase $\theta$ is behind the instruction phase $\theta\_ref$. The deviation $\Delta \theta$ having a positive value indicates that the rotational phase $\theta$ is ahead of the instruction phase $\theta\_ref$. However, the relationships between the polarity of the deviation $\Delta \theta$, and the rotational phase $\theta$ and the instruction phase $\theta\_ref$ are not limited to these. For example, the apparatus may be configured such that in a case where the rotational phase $\theta$ is behind the instruction phase $\theta\_ref$, the deviation $\Delta \theta$ has a positive value, and in a case where the rotational phase $\theta$ is ahead of the instruction phase $\theta\_ref$, the deviation $\Delta \theta$ has a negative value.

A torque applied to the conveying roller 306 when the sheet is conveyed by the conveying roller 307 and 306 in a case where the conveying roller 306 rotates at a velocity greater than the conveying roller 307 is greater than that in a case where the conveying roller 306 rotates at the same velocity as the conveying roller 307. This is because in a case where the conveying roller 306 rotates at a peripheral velocity greater than the conveying roller 307, the conveying roller 306 pull the sheet nipped by the conveying roller 307 downstream. If the torque applied to the conveying roller 306 becomes greater, the absolute value of the deviation $\Delta \theta$ becomes greater due to the fact that the rotational phase $\theta$ of the rotor 402 of the motor M2 for driving the conveying roller 306 is behind the instruction phase $\theta\_ref$. Specifically, as illustrated in FIG. 7, at a time t2 when the front end of the sheet reaches the nip portion of the conveying roller 306, the absolute value of the deviation $\Delta \theta$ increases. As described above, if the conveying roller 306 are driven at a velocity greater than the conveying roller 307, whereby it is possible to make the fluctuation range of the applied load torque larger when the sheet is nipped by the nip portion of the conveying roller 306.

In the present embodiment, a $\Delta \theta th$ is set as a threshold for the deviation $\Delta \theta$ for determining (discriminating) whether the conveyance of the sheet by the conveying roller 306 is started (the sheet is nipped by the conveying roller 306).

The sheet detector 700 determines (discriminates) whether the absolute value of the deviation $\Delta \theta$ becomes greater than or equal to the threshold $\Delta \theta th$. If the absolute value of the deviation $\Delta \theta$ becomes greater than or equal to the threshold $\Delta \theta th$, the sheet detector 700 outputs a signal indicating that the absolute value of the deviation $\Delta \theta$ becomes greater than or equal to the threshold $\Delta \theta th$. More specifically, if the absolute value of the deviation $\Delta \theta$ becomes greater than or equal to the threshold $\Delta \theta th$, the sheet detector 700 outputs a signal indicating that the front end of the sheet reaches the nip portion of the conveying roller 306. If the absolute value of the deviation $\Delta \theta$ is less than the threshold $\Delta \theta th$, the sheet detector 700 outputs a signal indicating that the absolute value of the deviation $\Delta \theta$ is less than the threshold $\Delta \theta th$. That is, if the absolute value of the deviation $\Delta \theta$ is less than the threshold $\Delta \theta th$, the sheet detector 700 outputs a signal indicating that the front end of the sheet does not reach the nip portion of the conveying roller 306.

In the present embodiment, the threshold $\Delta \theta th$ is set based on, among a plurality of types of sheets that can be conveyed in the image forming apparatus 100, the type of a sheet that causes the smallest fluctuation in load in the conveying roller when the sheet enters a nip portion of conveying roller. Specifically, for example, in a case where the types of sheets that can be conveyed in the image forming apparatus 100 are thick paper, plain paper, and thin paper, a fluctuation in load occurring in the conveying roller when the front end of the thick paper reaches the nip portion of the conveying roller is greater than a fluctuation in load occurring in the conveying roller when the front end of the plain paper or the thin paper reaches the nip portion of the conveying roller. Further, the fluctuation in load occurring in the conveying roller when the front end of the plain paper reaches the nip portion of the conveying roller is greater than the fluctuation in load occurring in the conveying roller when the front end of the thin paper reaches the nip portion of the conveying roller. Thus, the threshold $\Delta \theta th$ is set based on the fluctuation in load occurring in the conveying roller when the thin paper is conveyed.

The threshold $\Delta \theta th$ is set to, for example, a value greater than the absolute value of the deviation $\Delta \theta$ which is estimated when the thin paper (the sheet) is not nipped by the nip portion of the conveying roller 306 and the conveying roller 306 rotate at a constant velocity. Further, the threshold $\Delta \theta th$ is set to a value smaller than the maximum value (a peak value) of the absolute value of the deviation $\Delta \theta$ that increases as the conveying roller 307 and the conveying roller 306 convey the thin paper (the sheet). That is, when the absolute value of the deviation $\Delta \theta$ becomes greater than or equal to the threshold $\Delta\theta th$, it indicates that the front end of the sheet reaches the nip portion of the conveying roller 306.

As described above, in the present embodiment, the conveying roller 306 downstream in the conveying direction of the sheet is driven at a velocity greater than the conveying roller 307 upstream in the conveying direction. Consequently, it is possible to make relatively large the fluctuation range of the load torque applied to the conveying roller 306 when the front end of the sheet is nipped by the nip portion of the conveying roller 306. Consequently, it is possible to detect a sheet with high accuracy.

When a predetermined time T1 elapses after the signal indicating that the front end of the sheet has reached the nip portion of the conveying roller 306 is output from the sheet detector 700, the CPU 151a controls the motor M2 such that the peripheral velocity of the conveying roller 306 becomes VP1. The predetermined time T1 is set to, for example, a time longer than the time required from when the deviation $\Delta\theta$ fluctuates due to entry of the front end of the sheet to the nip portion of the conveying roller 306 until when the fluctuation stabilizes, and is set to a time shorter than the time required from when the fluctuation occurs until when the motor M2 is stopped. Consequently, it is possible to prevent the control of the motor M2 from becoming unstable due to slow-down of the rotational velocity of the rotor 402 of the motor M2 when the load torque applied to the rotor 402 of the motor M2 is fluctuating.

Then, the driving of the conveying roller 306 is stopped at timing determined in advance based on the operation sequence.

Thus, in the present embodiment, in the period from the time t1 to a time t3, the motor M2 is controlled such that the conveying roller 306 rotate at the peripheral velocity VP2, which is greater than the peripheral velocity VP1. Further, from the time t3 onward, the motor M2 is controlled such that the conveying roller 306 rotate at the peripheral velocity VP1.

Figure 8:
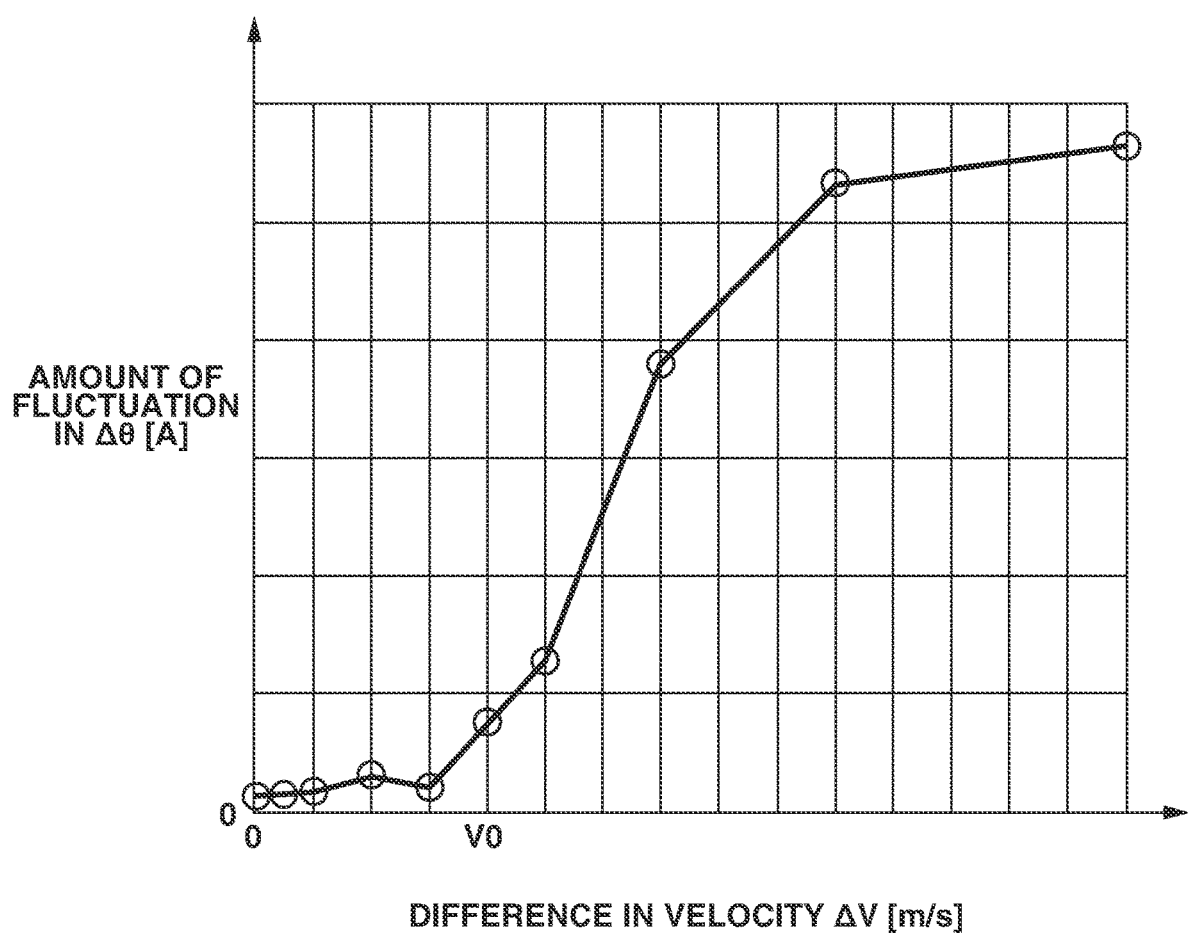
FIG. 8 is a diagram illustrating an example of a relationship between a difference in velocity $\Delta V$ and an amount of fluctuation in the deviation $\Delta\theta$.

FIG. 8 is a diagram illustrating an example of the relationship between the difference (the difference in velocity) $\Delta\theta$ between the peripheral velocity of the conveying roller 307 and the peripheral velocity of the conveying roller 306, and the deviation $\Delta\theta$ in the motor M2. FIG. 8 illustrates the amount of fluctuation in the deviation $\Delta\theta$ in a case where B5-size thin paper is conveyed. These results were obtained by experiment.

As illustrated in FIG. 8, in the state where the difference in peripheral velocity $\Delta V$ is greater than or equal to V0, the amount of fluctuation in the deviation $\Delta\theta$ is increased. Thus, in the present embodiment, the peripheral velocity VP2 is set such that the value of the peripheral velocity VP2 is greater by V0 than the peripheral velocity VP1. As described above, the difference in peripheral velocity $\Delta V$ is set such that the amount of fluctuation in the deviation $\Delta\theta$ becomes relatively great, so that it is possible to more accurately detect the sheet. The difference in peripheral velocity $\Delta V$ may be a value greater than V0. If, however, the difference in peripheral velocity $\Delta V$ is too great, the sheet may be damaged, or power consumption may increase. Thus, $\Delta V$ should be a value greater than V0 and the smallest possible value.

Figure 9:
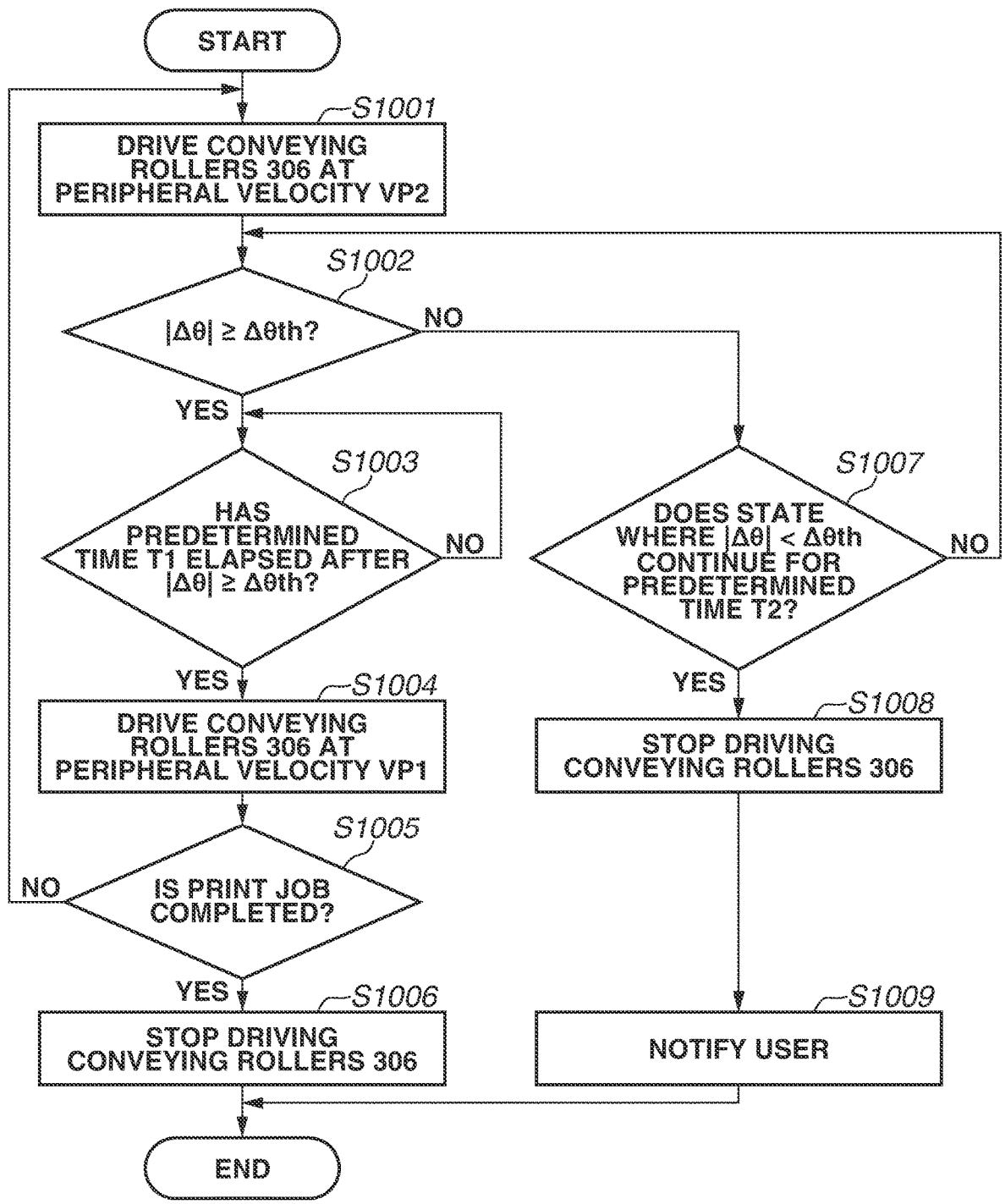
FIG. 9 is a flowchart illustrating a control method for controlling the conveying roller on the downstream side, according to the first embodiment.

FIG. 9 is a flowchart illustrating a control method for controlling the conveying roller 306. With reference to FIG. 9, the control of the conveying roller 306 according to the present embodiment is described below. The processing of the flowchart is executed by the CPU 151a.

If the CPU 151a outputs an enable signal indicating 'H' to the motor control device 157, then based on an instruction output from the CPU 151a, the motor control device 157 starts driving the motor M2, so that the driving of the conveying roller 306 is started. The enable signal is a signal permitting or prohibiting the operation of the motor control device 157. If the enable signal indicates 'L' (a low level), the CPU 151a prohibits the operation of the motor control device 157. That is, the control of the motor M2 by the motor control device 157 is ended. Further, if the enable signal indicates 'H' (a high level), the CPU 151a permits the operation of the motor control device 157, and based on an instruction output from the CPU 151a, the motor control device 157 controls the motor M2.

Next, in step S1001, the CPU 151a outputs to the motor control device 157 an instruction to control the motor M2 such that the conveying roller 306 downstream in the conveying direction rotate at the peripheral velocity VP2, which is greater by $\Delta V$ than the peripheral velocity VP1 of the conveying roller 307 upstream in the conveying direction. Consequently, the motor control device 157 controls the motor M2 such that the conveying roller 306 rotate at the peripheral velocity VP2.

In step S1002, if the absolute value of the deviation $\Delta\theta$ is greater than or equal to the threshold $\Delta\theta th$, i.e., if a signal indicating that the front end of the sheet has reached the nip portion of the conveying roller 306 is output from the sheet detector 700 to the CPU 151a (YES in step S1002), the processing proceeds to step S1003.

In step S1003, if the predetermined time T1 elapses after the absolute value of the deviation $\Delta\theta$ becomes greater than or equal to the threshold $\Delta\theta th$ (YES in step S1003), then in step S1004, the CPU 151a outputs to the motor control device 157 an instruction to control the motor M2 such that the conveying roller 306 rotate at the peripheral velocity VP1. Consequently, the motor control device 157 controls the motor M2 such that the conveying roller 306 rotate at the peripheral velocity VP1.

Then, in step S1005, if a print job is not completed (NO in step S1005), the processing returns to step S1001.

Further, in step S1005, if the print job is completed (YES in step S1005), then in step S1006, at a predetermined timing set in advance based on the operation sequence of the image forming apparatus 100, the CPU 151a controls the motor control device 157 to stop driving the motor M2. Consequently, the motor control device 157 stops driving the motor M2.

On the other hand, in step S1002, if the absolute value of the deviation $\Delta\theta$ is smaller than the threshold $\Delta\theta th$, i.e., if a signal indicating that the front end of the sheet has not reached the nip portion of the conveying roller 306 is output from the sheet detector 700 to the CPU 151a (NO in step S1002), the processing proceeds to step S1007.

In step S1007, if the state where the absolute value of the deviation $\Delta\theta$ is smaller than the threshold $\Delta\theta th$ does not continue for a predetermined time T2 (NO in step S1007), the processing returns to step S1002.

Further, in step S1007, if the state where the absolute value of the deviation $\Delta\theta$ is smaller than the threshold $\Delta\theta th$ continues for the predetermined time T2 (YES in step S1007), then in step S1008, the CPU 151a stops the driving of the conveying roller 306 (the conveyance of the sheet). Alternatively, the apparatus may be configured such that in step S1007, if the predetermined time T2 elapses after the conveying roller 306 are driven at the peripheral velocity VP2, then in step S1008, the CPU 151a stops the driving of the conveying roller 306 (the conveyance of the sheet). The predetermined time T2 is set to, for example, a time shorter than the time required from a time when the conveying roller 306 are driven at the peripheral velocity VP2 to a time when the driving of the motor M2 is stopped in step S1006. Further, the predetermined time T2 is set to, for example, a time longer than the time required from a time when the conveying roller 306 are driven at the peripheral velocity VP2 to a time when the sheet reaches the nip portion of the conveying roller 306.

Then, in step S1009, the CPU 151a indicates on the display unit provided in the operation unit 152 that an abnormal situation (e.g., a jam) has occurred in the conveyance of the sheet to notify the user of the state. Thus, it is determined whether the state where the absolute value of the deviation Δθ is smaller than the threshold Δθth continues for the predetermined time T2, so that it is possible to detect whether the sheet is normally conveyed.

As described above, in the present embodiment, the conveying roller downstream in a conveying direction rotates at a peripheral velocity greater than the conveying roller upstream in the conveying direction. Specifically, the conveying roller 306 is driven at the peripheral velocity VP2, which is greater than the peripheral velocity VP1 of the conveying roller 307. Then, based on whether the absolute value of the deviation Δθ in the motor M2 is greater than or equal to the threshold Δθth, it is detected whether the sheet enters (reaches) the nip portion of the conveying roller 306. Thus, the conveying roller 306 is driven at the peripheral velocity VP2, which is greater than the peripheral velocity VP1 of the conveying roller 307, so that it is possible to make larger the fluctuation range of the load torque applied when the sheet is nipped by the conveying roller 306. That is, it is possible to make the fluctuation range of the deviation Δθ larger. Consequently, it is possible to detect that the sheet has entered (reached) the nip portion of the conveying roller 306, with higher accuracy than in a case where the conveying roller 306 and 307 rotate at the same velocity. Accordingly, it is possible to detect with high accuracy a sheet that is being conveyed.

As described above, in the present embodiment, not by a sensor such as a photosensor but based on a signal output from the motor control device 157, the sheet is detected. Consequently, it is possible to detect a sheet with high accuracy while preventing an increase in the size of an image forming apparatus (a sheet conveying apparatus) and an increase in cost.

Further, in the present embodiment, when it is detected that the sheet has entered (reached) the nip portion of the conveying roller 306, the CPU 151a slows down the peripheral velocity of the conveying roller 306 to the same peripheral velocity as the conveying roller 307. Consequently, it is possible to prevent the sheet from being damaged due to the fact that the sheet is pulled in the conveying direction by the conveying roller 306. Further, the peripheral velocity of the conveying roller 306 is slowed down, whereby it is possible to reduce the power consumed to drive the motor M2.

Further, in the present embodiment, if the state where the absolute value of the deviation Δθ is smaller than the threshold Δθth continues for the predetermined time T2, the conveyance of the sheet is stopped. Then, it is indicated on the display unit provided in the operation unit 152 that an abnormal situation (e.g., a jam) has occurred in the conveyance of the sheet to notify the user of the state. With such a configuration, it is possible to prevent the conveying roller from being driven in the state where a sheet is not being normally conveyed. Consequently, it is possible to prevent the conveying roller or the sheet from being damaged, and power consumption from increasing.

In the present embodiment, if the predetermined time T1 elapses after the absolute value of the deviation Δθ becomes greater than or equal to the threshold Δθth, the peripheral velocity of the conveying roller 306 is slowed down. The present disclosure, however, is not limited to this. For example, as soon as the absolute value of the deviation Δθ becomes greater than or equal to the threshold Δθth, the CPU 151a may control the motor M2 such that the peripheral velocity of the conveying roller 306 becomes VP1. Consequently, it is possible to reduce power consumed to drive the motor M2 as much as possible.

In the present embodiment, the CPU 151a slows down the peripheral velocity of the conveying roller 306 from VP2 to VP1. The present disclosure, however, is not limited to this. For example, the CPU 151a may slow down the rotation of the conveying roller 306 such that the difference in velocity ΔV between the peripheral velocities VP2 and VP1 becomes smaller.

The configuration of the present embodiment (i.e., configuration for detecting a sheet based on a signal output from the motor control device 157) can be applied not only to the conveying rollers 307 and 306 but also to two adjacent (adjoining) conveying rollers. For example, the configuration of the present embodiment may be applied to the feed roller 327 serving as the conveying roller upstream in the conveying direction of the sheet, and the conveying roller 307 serving as the conveying roller downstream in the conveying direction.

[Image Forming Apparatus]

Next, s second embodiment is described below. An image forming apparatus 100 according to the present embodiment is described. In the following description, components of the image forming apparatus 100 similar to those in the first embodiment are not described.

In the present embodiment, the system controller 151 is connected to a motor control device 162, which controls a motor M3 for driving the feed roller 327, and a motor control device 163, which controls a motor M4 for driving the feed roller 328. The system controller 151 is also connected to the motor control devices 157 and 158, which have been described in the first embodiment.

The configurations of the motor control devices 162 and 163 are similar to those of the motor control devices 157 and 158 according to the first embodiment, and therefore are not described here.

[Method for Detecting Sheet]

Next, a description is given of a method for detecting a sheet that is conveyed, according to the present embodiment. In the first embodiment, the difference in peripheral velocity ΔV between the peripheral velocity VP1 of the conveying roller 307 and the peripheral velocity VP2 of the conveying roller 306 is set to a predetermined value, regardless of the type of the sheet that is conveyed (the sheet type). In the present embodiment, the value of ΔV is changed according to the sheet type.

FIG. 10 is a table illustrating the relationships between the sheet type, and a difference in peripheral velocity ΔV and a deviation Δθ in a motor for driving feed roller. The table illustrated in FIG. 10 is stored in the ROM 151b.

A fluctuation in load occurring in conveying roller when the front end of the thick paper enters a nip portion of the conveying roller is greater than a fluctuation in load occurring in the conveying roller when the front end of the plain paper or the thin paper enters the nip portion of the conveying roller. Thus, even if a difference in peripheral velocity ΔV3 which corresponds to the thick paper, is smaller than a difference in peripheral velocity ΔV1 which corresponds to the thin paper, and a difference in peripheral velocity ΔV2 which corresponds to the plain paper, it is possible to accurately detect the thick paper.

Further, the fluctuation in load occurring in the conveying roller when the front end of the plain paper enters the nip portion of the conveying roller is greater than the fluctuation in load occurring in the conveying roller when the front end of the thin paper enters the nip portion of the conveying roller. Thus, even if the difference in peripheral velocity ΔV2 which corresponds to the plain paper, is smaller than the difference in peripheral velocity ΔV1 which corresponds to the thin paper, it is possible to accurately detect the plain paper.

According to the above-description, in the present embodiment, the difference in peripheral velocity ΔV is set such that ΔV1>ΔV2>ΔV3.

In FIG. 10, the deviation Δθ for the peripheral velocity difference ΔV is illustrated with respect to each sheet type. Specifically, FIG. 10 illustrates, for example, the deviation Δθ in a case where the thin paper is conveyed, the deviation Δθ in a case where the plain paper is conveyed, and the deviation Δθ in a case where the thick paper is conveyed when the peripheral velocity difference ΔV is the peripheral velocity difference ΔV1 which corresponds to the thin paper. It should be noted that Δθ14>Δθ13>Δθ12>Δθ11, Δθ24>Δθ23>Δθ22>Δθ21, and Δθ34>Δθ33>Δθ32>Δθ31. Further, Δθ11>Δθ21>Δθ31, Δθ12>Δθ22>Δθ32, Δθ13>Δθ23>Δθ33, and Δθ14>Δθ24>Δθ34.

Based on the sheet type set by the user using the operation unit 152 and the table illustrated in FIG. 10, the CPU 151a sets the difference in peripheral velocity ΔV. Specifically, for example, in a case where the user sets the sheet type to the thin paper, the CPU 151a sets the difference velocity ΔV to ΔV1.

In the present embodiment, the image forming apparatus 100 is configured such that based on the deviation Δθ output from the motor control device 162, which controls the motor M3 for driving the feed roller 327, the type of a sheet that is actually being conveyed is determined. A description is given below of the configuration in which the type of a sheet that is actually being conveyed is determined. While the feed roller 327 are described below, the same applies to the configuration of the feed roller 328.

Figure 11:
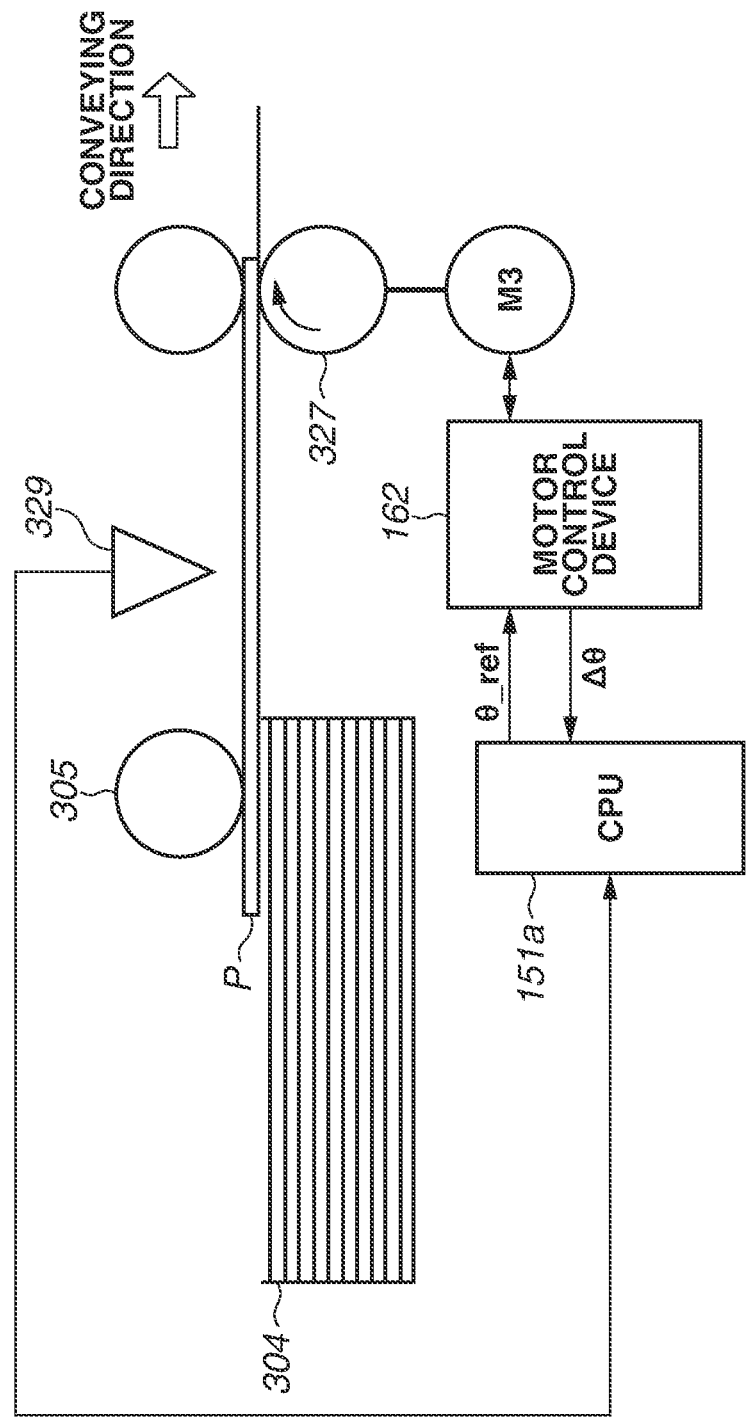
FIG. 11 is a diagram illustrating a configuration for determining the sheet type.

FIG. 11 is a diagram illustrating the configuration for determining the sheet type. As illustrated in FIG. 11, between the pickup roller 305, which feeds a sheet stored in the sheet storage tray 304, and the feed roller 327, the sheet sensor 329 which detects the sheet is provided. The detection result of the sheet sensor 329 and the deviation Δθ output from the motor control device 162 are input to the CPU 151a. Based on the detection result output from the sheet sensor 329, the input deviation Δθ, and the table illustrated in FIG. 10, the CPU 151a determines the type of the sheet that is actually being conveyed.

Figure 12:
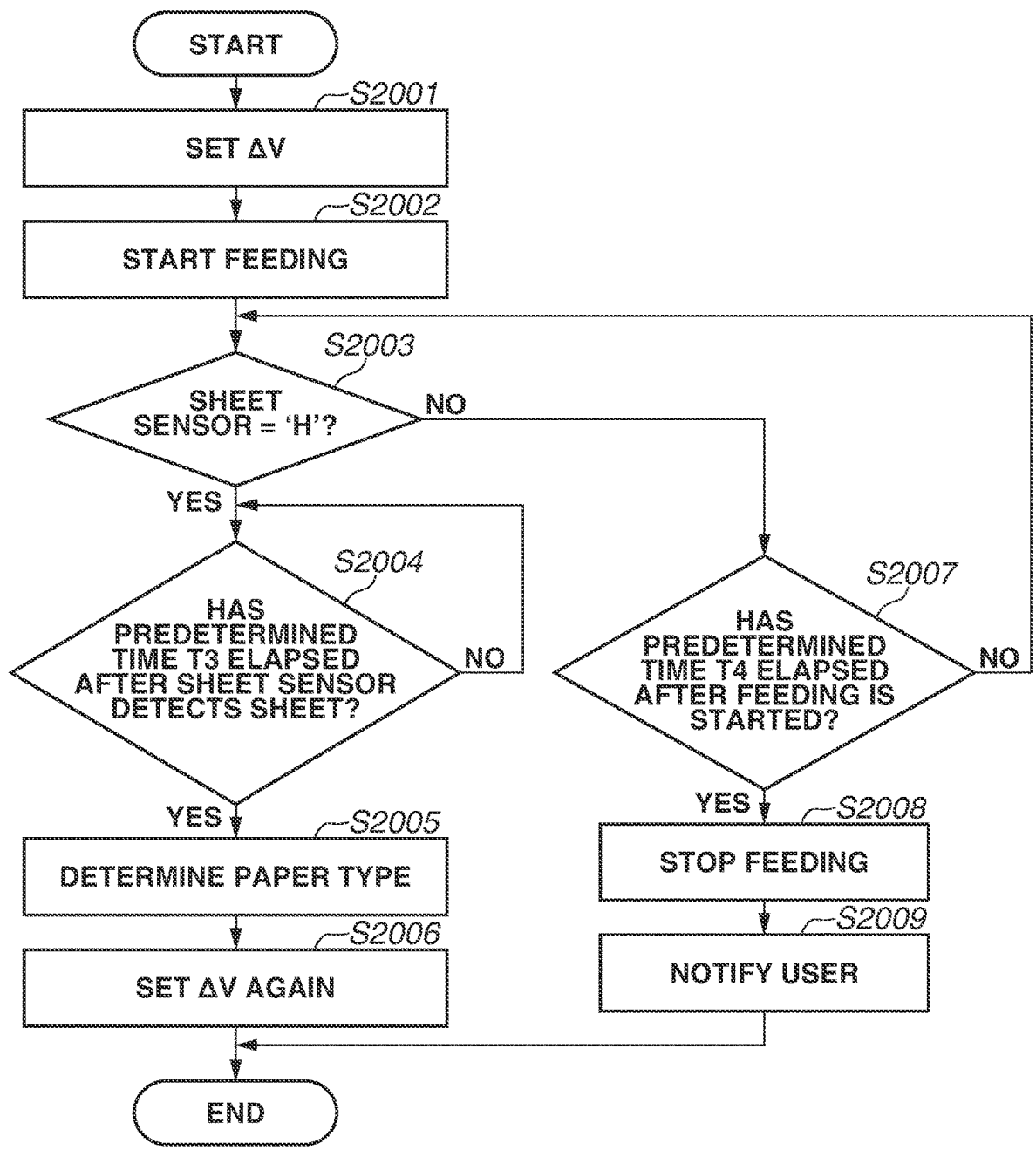
FIG. 12 is a flowchart illustrating a method for determining the sheet type.

FIG. 12 is a flowchart illustrating a method for determining the sheet type. With reference to FIG. 12, a description is given below of the method for determining the sheet type. The processing of the flowchart is executed by the CPU 151a. The processing of the flowchart is executed, for example, in a case where a sheet is fed for the first time after the user sets the sheet type using the operation unit 152.

If an image forming operation is started, then in step S2001, based on the sheet type set by the user using the operation unit 152 and the table stored in the ROM 151b, the CPU 151a sets the peripheral velocity difference ΔV.

Then, in step S2002, the CPU 151a starts a feeding operation for feeding a sheet stored in the sheet storage tray 304.

In step S2003, if the sheet sensor 329 detects the sheet (if a signal from the sheet sensor 329 changes from 'L' to 'H') (YES in step S2003), the processing proceeds to step S2004.

In step S2004, when a predetermined time T3 has elapsed after the sheet sensor 329 detects the sheet (YES in step S2004), then in step S2005, based on the acquired deviation Δθ and the table, the CPU 151a determines the sheet type. Specifically, for example, if the peripheral velocity difference ΔV set in step S2001 is ΔV1, and the deviation Δθ is between Δθ11 and Δθ12, the CPU 151a determines that the sheet that is being conveyed is the thin paper. Further, for example, if the peripheral velocity difference ΔV set in step S2001 is ΔV1, and the deviation Δθ is between Δθ12 and Δθ13, the CPU 151a determines that the sheet that is being conveyed is the plain paper. Further, for example, if the peripheral velocity difference ΔV set in step S2001 is ΔV1, and the deviation Δθ is between Δθ13 and Δθ14, the CPU 151a determines that the sheet that is being conveyed is the thick paper. The predetermined time T3 is set to the time required from when the sheet sensor 329 detects the sheet until when the front end of the sheet enters a nip portion of the feed roller 327.

Then, in step S2006, based on the sheet type determined in step S2005 and the table illustrated in FIG. 10, the CPU 151a sets the peripheral velocity difference ΔV again. Specifically, for example, if the sheet type determined in step S2005 is the plain paper, the CPU 151a sets the peripheral velocity difference ΔV to ΔV2. The CPU 151a applies the peripheral velocity difference ΔV set in step S2006 to the control of roller downstream of the feed roller 327 (e.g., the control of the velocity difference between the conveying roller 306 and 307). As described above, conveying roller is driven based on the peripheral velocity difference ΔV set according to the sheet type, so that it is possible to detect with high accuracy that a sheet has entered (reached) a nip portion of the conveying roller. The peripheral velocity difference ΔV set in step S2006 is also applied to the control of the peripheral velocity difference between the roller when the second sheet and thereafter are conveyed (fed).

Further, in step S2003, if the sheet sensor 329 does not detect the sheet (if the signal from the sheet sensor 329 remains 'L') (NO in step S2003), the processing proceeds to step S2007.

In step S2007, if a predetermined time T4 has not elapsed after the feeding operation is started (NO in step S2007), the processing returns to step S2003.

Further, in step S2007, if the predetermined time T4 has elapsed after the feeding operation is started (YES in step S2007), then in step S2008, the CPU 151a stops the feeding operation. The predetermined time T4 is set to, for example, a time longer than the time required from when the feeding operation is started until when the front end of the sheet reaches the position where the sheet sensor 329 detects the sheet.

Then, in step S2009, the CPU 151a indicates on the display unit provided in the operation unit 152 that the sheet is not fed to notify the user of the state.

As described above, in the present embodiment, ΔV is set according to the sheet type. Specifically, based on the sheet type set by the user using the operation unit 152 and the table, the CPU 151a sets the peripheral velocity difference ΔV. The relationships between the difference in peripheral velocity ΔV1, which corresponds to the thin paper, the difference in peripheral velocity ΔV2, which corresponds to the plain paper, and the difference in peripheral velocity $\Delta V3$, which corresponds to the thick paper, are $\Delta V1 > \Delta V2 > \Delta V3$. Further, based on the deviation $\Delta\theta$ in the feed roller 327, the CPU 151a determines the sheet type, and based on the determined sheet type, the CPU 151a sets the peripheral velocity difference $\Delta V$ again. Consequently, for example, it is possible to avoid the situation where the thin paper is conveyed in the state where the peripheral velocity difference $\Delta V3$ corresponding to the thick paper is set and it is not possible to detect that the thin paper has entered (reached) a nip portion of conveying roller.

As described above, in the present embodiment, an optimal peripheral velocity difference $\Delta V$ is set according to the sheet type, so that it is possible to detect with high accuracy that a sheet has entered (reached) a nip portion of conveying roller, and to reduce power consumption.

Further, in the present embodiment, if the predetermined time T4 has elapsed after the feeding operation is started but the sheet sensor 329 does not detect the sheet, the CPU 151a stops the feeding operation and indicates on the display unit provided in the operation unit 152 that the sheet is not fed to notify the user of the state. Consequently, it is possible to prevent power consumption from increasing due to driving the conveying roller in the state where a sheet is not fed.

In the present embodiment, the peripheral velocity difference $\Delta V$ is set again based on the determined sheet type. The present disclosure, however, is not limited to this. For example, the apparatus may be configured such that the CPU 151a compares the determined sheet type with the sheet type set by the user. If these sheet types do not coincide with each other, the CPU 151a stops the feeding operation and notifies the user that the type of the sheet that is being conveyed does not coincide with the sheet type set by the user.

Further, in the first and second embodiments, the time t1 when the driving of the conveying roller 306 is started is determined in advance based on the operation sequence of the image forming apparatus 100. The present disclosure, however, is not limited to this. For example, the apparatus may be configured such that if it is detected by the method described in the first or second embodiment that the front end of the sheet has passed through a nip portion of the conveying roller 307, the driving of the conveying roller 306 is started. Alternatively, the apparatus may be configured such that based on the number of pulses output from the CPU 151a to the motor control device 157, the driving of the conveying roller 306 is started.

Further, in the first and second embodiments, the driving of the conveying roller 306 is stopped at the timing determined in advance based on the operation sequence. The present disclosure, however, is not limited to this. For example, the apparatus may be configured such that if it is detected that the front end of the sheet has passed through a nip portion of conveying roller downstream of the conveying roller 306, the driving of the conveying roller 306 is stopped. Alternatively, the apparatus may be configured such that based on the number of pulses output from the CPU 151a to the motor control device 157, the driving of the conveying roller 306 is stopped.

Figure 13:
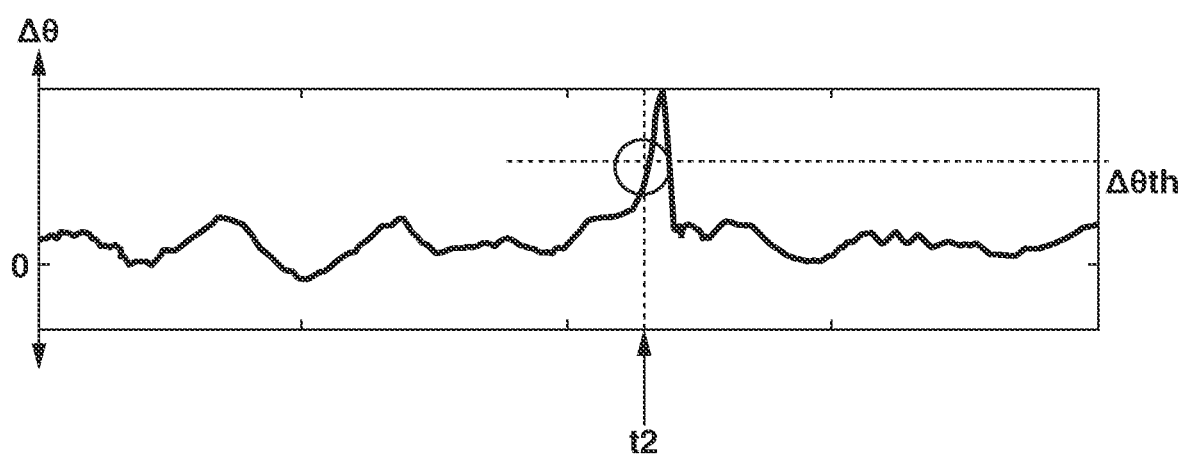
FIG. 13 is a diagram illustrating a deviation $\Delta\theta$ in a motor for driving conveying roller on a upstream side rotating at a peripheral velocity which is slower than conveying roller on the downstream side.

Further, in the first and second embodiments, the sheet is detected based on the deviation $\Delta\theta$ in the motor for driving the conveying roller on a downstream side at a peripheral velocity greater than the conveying roller on an upstream side. The present disclosure, however, is not limited to this. For example, the sheet may be detected based on the deviation $\Delta\theta$ in the motor for driving the conveying roller on the upstream side at a peripheral velocity slower than the downstream conveying roller. When the front end of the sheet enters the nip portion of the conveying roller on the downstream side in the state where the peripheral velocity of the conveying roller on the downstream side is greater than the conveying roller on an upstream side, a load torque applied to the motor for driving the conveying roller on the upstream side decreases. This is because a force in the rotational direction acts on the conveying roller on the upstream side because the sheet nipped by the conveying roller on the upstream side is pulled by the downstream conveying roller. Thus, when the peripheral velocity of the conveying roller on the downstream side is greater than the conveying roller on the upstream side, the deviation $\Delta\theta$ in the motor for driving the conveying roller on the upstream side changes as illustrated in FIG. 13. The change in the deviation $\Delta\theta$ illustrated in FIG. 13 is merely an example, and is not limited to this. For example, the fluctuation range of the deviation $\Delta\theta$ is not necessarily the same as that of the deviation $\Delta\theta$ in the motor on the downstream side. In FIG. 13, the deviation $\Delta\theta$ having a negative value indicates that the rotational phase $\theta$ is behind the instruction phase $\theta\_ref$. The deviation $\Delta\theta$ having a positive value indicates that the rotational phase $\theta$ is ahead of the instruction phase $\theta\_ref$. However, the relationships between the polarity of the deviation $\Delta\theta$, and the rotational phase $\theta$ and the instruction phase $\theta\_ref$ are not limited to these. For example, the apparatus may be configured such that in a case where the rotational phase $\theta$ is behind the instruction phase $\theta\_ref$, the deviation $\Delta\theta$ has a positive value, and in a case where the rotational phase $\theta$ is ahead of the instruction phase $\theta\_ref$, the deviation $\Delta\theta$ has a negative value.

Further, in the first and second embodiments, the CPU 151a controls the driving of the conveying roller such that the peripheral velocity of the conveying roller on the downstream side in the conveying direction is greater than that of the conveying roller on the upstream side in the conveying direction. The present disclosure, however, is not limited to this. For example, the apparatus may be configured such that the conveying roller are controlled so that the peripheral velocity of the conveying roller on the downstream is slower than that of the conveying roller on the upstream side. In this case, if the front end of the sheet reaches the nip portion of the conveying roller on the downstream side, the sheet bends between the upstream and downstream conveying roller because the conveying roller on the upstream side are faster than the conveying roller on the downstream side. Consequently, an elastic force acts on the sheet. Due to the elastic force, a force acts on the conveying roller on the upstream side in a direction opposite to the rotational direction. Consequently, the load torque applied to the motor for driving the conveying roller on the upstream side increases. More specifically, due to the elastic force, the deviation $\Delta\theta$ in the motor for driving the conveying roller on the upstream side fluctuates as illustrated in FIG. 7, for example. Further, due to the elastic force, a force acts on the conveying roller on the downstream side in the rotational direction. Consequently, a load torque applied to the motor for driving the conveying roller on the downstream side decreases. More specifically, due to the elastic force, the deviation $\Delta\theta$ in the motor for driving the conveying roller on the downstream side fluctuates as illustrated in FIG. 13, for example. Thus, in the state where the conveying roller are controlled such that the peripheral velocity of the conveying roller on the downstream side is slower than that of the upstream conveying roller, the sheet may be detected based on the deviation $\Delta\theta$ in the motor for driving the upstream or downstream conveying roller.

[Image Forming Apparatus]

Next, a third embodiment is described below. An image forming apparatus 100 according to the present embodiment is described. In the following description, components of the image forming apparatus 100 similar to those in the first embodiment are not described.

Figure 14:
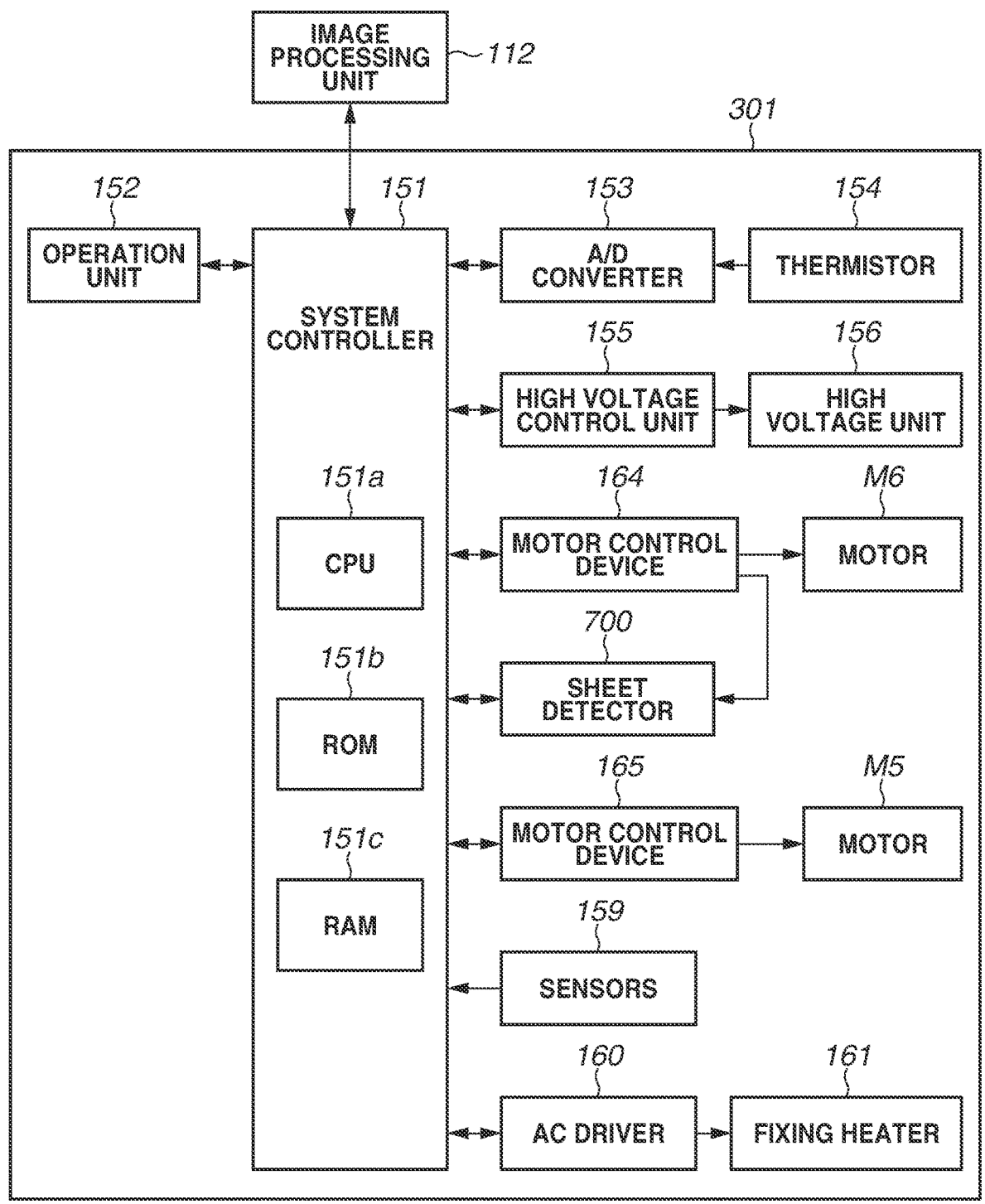
FIG. 14 is a block diagram illustrating a control configuration of an image forming apparatus according to a third embodiment.

FIG. 14 is a block diagram illustrating an example of the control configuration of the image forming apparatus 100 according to the present embodiment. As illustrated in FIG. 14, the system controller 151 is connected to a motor control device 165, which controls a motor M5 for driving fixing roller 331, and a motor control device 164, which controls a motor M6 for driving the sheet discharge roller 319. The fixing roller 331 are included in the fixing device 318. The system controller 151 is also connected to the motor control devices 157 and 158, which have been described in the first embodiment, and the motor control devices 162 and 163, which have been described in the second embodiment.

The configurations of the motor control devices 164 and 165 are similar to those of the motor control devices 157 and 158 according to the first embodiment, and therefore are not described here.

[Method for Detecting Sheet that is Conveyed]

Figure 15:
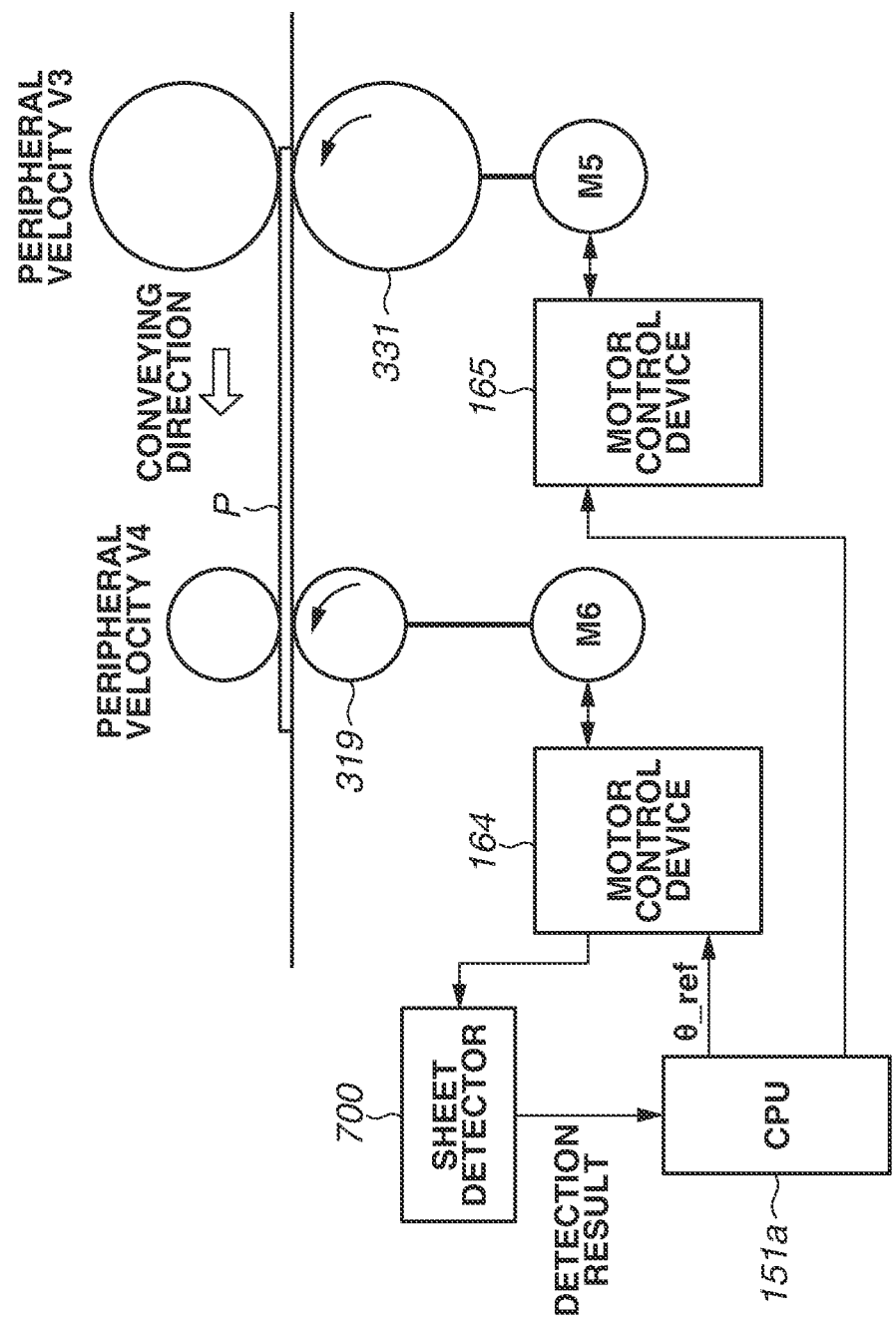
FIG. 15 is a diagram illustrating a configuration in which fixing roller and sheet discharge roller are driven.

FIG. 15 is a diagram illustrating a configuration in which the fixing roller 331, which are included in the fixing device 318, and the sheet discharge roller 319 are driven. As illustrated in FIG. 15, the fixing roller 331 are driven by the motor M5, and the motor M5 is controlled by the motor control device 165. Further, the sheet discharge roller 319 are driven by the motor M6, and the motor M6 is controlled by the motor control device 164. In FIG. 15, the components (e.g., a heater and the like) of the fixing device 318 are omitted.

By a method described below, the sheet detector 700 determines whether the rear end of a sheet has passed through (has come out of) a nip portion of the fixing roller 331. Then, the sheet detector 700 outputs the determination result (the detection result) to the CPU 151a. More specifically, in the present embodiment, not by a sensor such as a photosensor but based on a signal output from the motor control device 165, it is determined whether the rear end of the sheet has come out of the nip portion of the fixing roller 331. For example, the sheet detector 700 outputs the determination result in a predetermined time cycle (e.g., the cycle of inputting of the deviation $\Delta\theta$).

A description is given below of a method for detecting whether the rear end of the sheet has passed through (has come out of) the nip portion of the fixing roller 331. In the following description, the motor control devices 164 and 165 perform phase feedback control based on the instruction phase $\theta\_ref$ output from the CPU 151a. The instruction phase $\theta\_ref$ is generated by the CPU 151a based on target velocities of the motors M5 and M6. Actually, the CPU 151a outputs a pulse signal to each of the motor control devices 164 and 165. The number of pulses corresponds to an instruction phase, and the frequency of pulses corresponds to a target velocity. The target velocity is determined based on a target value of the peripheral velocity of roller.

Figure 16A:
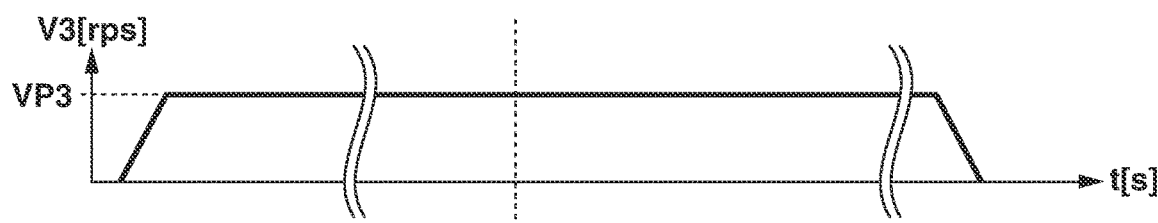
FIGS. 16A and 16B are a time chart illustrating a peripheral velocity of the fixing roller and a peripheral velocity of the sheet discharge roller.
Figure 16B:
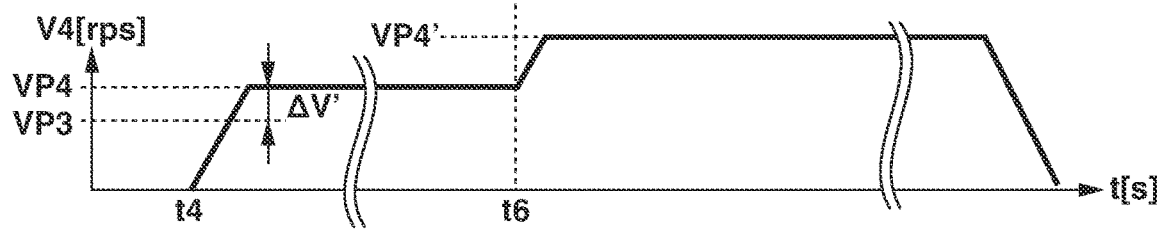

FIGS. 16A and 16B are a time chart illustrating the peripheral velocity of the fixing roller 331 and the peripheral velocity of the sheet discharge roller 319. FIG. 16A is a diagram illustrating a peripheral velocity V3 of the fixing roller 331 and, FIG. 16B is a diagram illustrating a peripheral velocity V4 of the sheet discharge roller 319.

In the present embodiment, the motor M6 is controlled such that the peripheral velocity V4 of the sheet discharge roller 319 becomes VP4. The motor M5 is controlled such that the peripheral velocity V3 of the fixing roller 331 becomes VP3. The peripheral velocity VP4 of the sheet discharge roller 319 is a value greater by $\Delta V'$ than the peripheral velocity VP3 of the fixing roller 331. That is, the sheet discharge roller 319 rotate at a peripheral velocity greater than the fixing roller 331 by $\Delta V'$. As described above, the peripheral velocity of the sheet discharge roller 319 is set to a peripheral velocity greater than the fixing roller 331, so that the accuracy of detecting the sheet is refined as compared with a case where the sheet discharge roller 319 and the fixing roller 331 rotate at the same peripheral velocity, as described below. The velocity difference $\Delta V'$ is set to a velocity difference such that even if the sheet discharge roller 319 slip on the surface of the sheet conveyed by the fixing roller 331 rotating at the peripheral velocity V3, a fixed image is not damaged.

Figure 17:
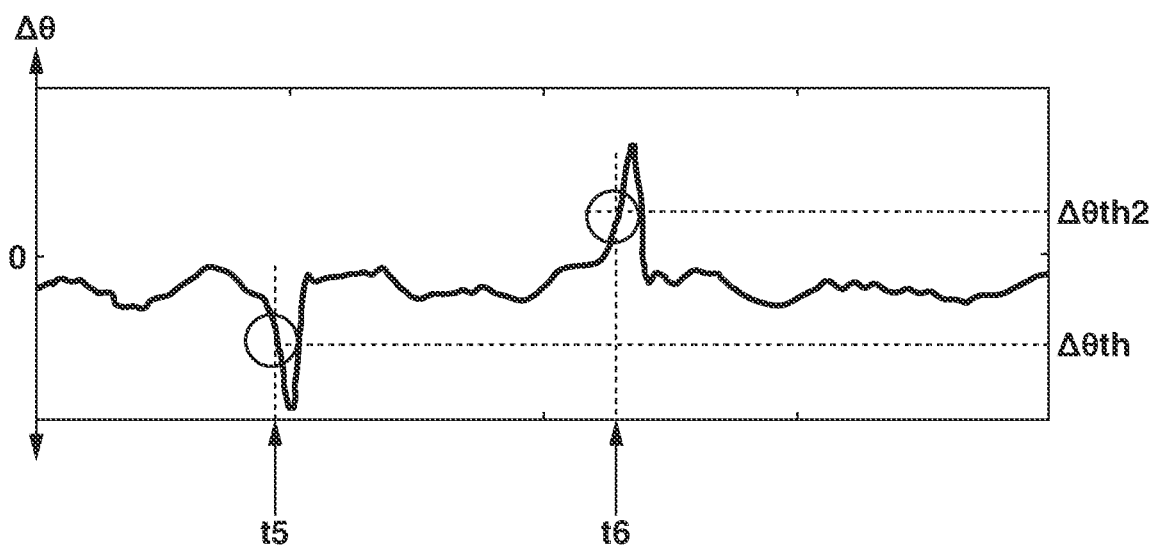
FIG. 17 is a diagram illustrating a deviation $\Delta\theta$ output from a motor control device that controls a motor for driving the sheet discharge roller.

FIG. 17 is a diagram illustrating the deviation $\Delta\theta$ output from the motor control device 164, which controls the motor M4 for driving the sheet discharge roller 319. In FIG. 17, the deviation $\Delta\theta$ having a negative value indicates that the rotational phase $\theta$ is behind the instruction phase $\theta\_ref$. The deviation $\Delta\theta$ having a positive value indicates that the rotational phase $\theta$ is ahead of the instruction phase $\theta\_ref$. However, the relationships between the polarity of the deviation $\Delta\theta$, and the rotational phase $\theta$ and the instruction phase $\theta\_ref$ are not limited to these. For example, the apparatus may be configured such that in a case where the rotational phase $\theta$ is behind the instruction phase $\theta\_ref$, the deviation $\Delta\theta$ has a positive value, and in a case where the rotational phase $\theta$ is ahead of the instruction phase $\theta\_ref$, the deviation $\Delta\theta$ has a negative value.

In the present embodiment, the sheet is conveyed by the fixing roller 331 rotating at the peripheral velocity VP3. Further, at a time t4 which is set based on the operation sequence of the image forming apparatus 100 determined in advance, the CPU 151a starts the driving of the sheet discharge roller 319. The peripheral velocity VP3 of the fixing roller 331 is the conveying velocity at which the sheet is conveyed. The peripheral velocity VP3 is stored in advance in the ROM 151b. Further, the peripheral velocity V4 of the sheet discharge roller 319 is set to the peripheral velocity VP4 which is greater by $\Delta V'$ than the peripheral velocity VP3. The time t4 when the driving of the sheet discharge roller 319 is started is set such that the peripheral velocity of the sheet discharge roller 319 reaches VP4 by the time when the front end of the sheet that is being conveyed by the fixing roller 331 reaches a nip portion of the sheet discharge roller 319.

A torque applied to the sheet discharge roller 319 when the sheet is conveyed being nipped by the fixing roller 331 and the sheet discharge roller 319 is higher in a case where the sheet discharge roller 319 rotate at a peripheral velocity greater than that of the fixing roller 331, than a case where the sheet discharge roller 319 rotate at the same peripheral velocity as that of the fixing roller 331. This is because in a case where the sheet discharge roller 319 rotate at a peripheral velocity greater than that of the fixing roller 331, the sheet discharge roller 319 pull the sheet nipped by the fixing roller 331 downstream. If the load torque applied to the sheet discharge roller 319 becomes greater, the absolute value of the deviation $\Delta\theta$ becomes greater due to the fact that the rotational phase $\theta$ of a rotor of the motor M6 for driving the sheet discharge roller 319 is behind the instruction phase $\theta\_ref$. Specifically, for example, as illustrated in FIG. 17, at a time t5 when the conveyance of the sheet by the sheet discharge roller 319 is started (the sheet is nipped by the sheet discharge roller 319), the absolute value of the deviation $\Delta\theta$ is increased.

Further, in a case where the sheet discharge roller 319 rotate at a peripheral velocity greater than that of the fixing roller 331, the sheet discharge roller 319 pull the sheet nipped by the fixing roller 331. Thus, the load torque applied to the sheet discharge roller 319 conveying the sheet is greater in the state where the sheet is nipped by the fixing roller 331 than in the state where the sheet is not nipped by the fixing roller 331. More specifically, when the rear end of the sheet comes out of the nip portion of the fixing roller 331, the load torque applied to the sheet discharge roller 319 conveying the sheet becomes smaller. If the load torque applied to the sheet discharge roller 319 becomes smaller, the absolute value of the deviation $\Delta\theta$ becomes greater due to the fact that the rotational phase $\theta$ of the rotor of the motor M6 for driving the sheet discharge roller 319 is ahead of the instruction phase $\theta\_ref$. Specifically, for example, as illustrated in FIG. 17, at a time t6 when the rear end of the sheet comes out of the nip portion of the fixing roller 331, the absolute value of the deviation $\Delta\theta$ is increased. The time t6 is a time after the time t5.

In a case where the sheet discharge roller 319 and the fixing roller 331 rotate at the same peripheral velocity, the fluctuation range of the load torque applied to the sheet discharge roller 319 when the rear end of the sheet comes out of the nip portion of the fixing roller 331 is smaller than in a case where the sheet discharge roller 319 rotate at a peripheral velocity greater than that of the fixing roller 331. Thus, if the sheet discharge roller 319 are driven at a velocity greater than that of the fixing roller 331, it is possible to make larger the fluctuation range of the load torque applied when the rear end of the sheet comes out of the nip portion of the fixing roller 331.

In the present embodiment, a threshold $\Delta\theta th$ is set as a threshold for the deviation $\Delta\theta$ to determine whether the conveyance of the sheet by the sheet discharge roller 319 is started (the sheet is nipped by the sheet discharge roller 319). Further, a threshold $\Delta\theta th2$ is set as a threshold for the deviation $\Delta\theta$ to determine whether the rear end of the sheet has come out of the nip portion of the fixing roller 331.

The sheet detector 700 determines whether the absolute value of the deviation $\Delta\theta$ has become greater than or equal to the threshold $\Delta\theta th$. If the absolute value of the deviation $\Delta\theta$ has become greater than or equal to the threshold $\Delta\theta th$, the sheet detector 700 outputs a signal indicating that the absolute value of the deviation $\Delta\theta$ has become greater than or equal to the threshold $\Delta\theta th$. More specifically, if the absolute value of the deviation $\Delta\theta$ has become greater than or equal to the threshold $\Delta\theta th$, the sheet detector 700 outputs a signal indicating that the conveyance of the sheet by the sheet discharge roller 319 is started (the sheet is nipped by the sheet discharge roller 319). If the absolute value of the deviation $\Delta\theta$ is less than the threshold $\Delta\theta th$, the sheet detector 700 outputs a signal indicating that the absolute value of the deviation $\Delta\theta$ is less than the threshold $\Delta\theta th$. That is, if the absolute value of the deviation $\Delta\theta$ is less than the threshold $\Delta\theta th$, the sheet detector 700 outputs a signal indicating that the front end of the sheet has not reached the nip portion of the sheet discharge roller 319.

If the sheet detector 700 outputs the signal indicating that the absolute value of the deviation $\Delta\theta$ has become greater than or equal to the threshold $\Delta\theta th$, then, the sheet detector 700 determines whether the absolute value of the deviation $\Delta\theta$ has become greater than or equal to the threshold $\Delta\theta th2$. If the absolute value of the deviation $\Delta\theta$ has become greater than or equal to the threshold $\Delta\theta th2$, the sheet detector 700 outputs a signal indicating that the absolute value of the deviation $\Delta\theta$ has become greater than or equal to the threshold $\Delta\theta th2$. More specifically, if the absolute value of the deviation $\Delta\theta$ has become greater than or equal to the threshold $\Delta\theta th2$, the sheet detector 700 outputs a signal indicating that the rear end of the sheet has come out of the nip portion of the fixing roller 331. If the absolute value of the deviation $\Delta\theta$ is less than the threshold $\Delta\theta th2$, the sheet detector 700 outputs a signal indicating that the absolute value of the deviation $\Delta\theta$ is less than the threshold $\Delta\theta th2$. More specifically, if the absolute value of the deviation $\Delta\theta$ is less than the threshold $\Delta\theta th2$, the sheet detector 700 outputs a signal indicating that the rear end of the sheet has not come out of the nip portion of the fixing roller 331.

The polarities of the thresholds $\Delta\theta th$ and $\Delta\theta th2$ are opposite to each other, and the absolute values of the thresholds $\Delta\theta th$ and $\Delta\theta th2$ may be the same value or different values. The threshold $\Delta\theta th$ is set by a method similar to that described in the first embodiment. The threshold $\Delta\theta th2$ is set based on, among the types of sheets that can be conveyed in the image forming apparatus 100, the type of a sheet that causes the smallest fluctuation in load which occurs in conveying roller when the sheet is conveyed. Specifically, for example, in a case where the types of sheets that can be conveyed in the image forming apparatus 100 are thick paper, plain paper, and thin paper, a fluctuation in load which occurs in sheet discharge roller when the front end of the thick paper is conveyed is greater than a fluctuation in load occurring in the sheet discharge roller when the plain paper or the thin paper is conveyed. Further, the fluctuation in load occurring in the sheet discharge roller when the plain paper is conveyed is greater than the fluctuation in load occurring in the sheet discharge roller when the thin paper is conveyed. Thus, the threshold $\Delta\theta th2$ is set based on the fluctuation in load occurring in the sheet discharge roller when the thin paper is conveyed.

More specifically, the threshold $\Delta\theta th2$ is set to, for example, a value greater than the absolute value of the deviation $\Delta\theta$ estimated when the thin paper (the sheet) is not nipped by the nip portion of the sheet discharge roller 319 and the sheet discharge roller 319 rotate at a constant velocity. Further, the threshold $\Delta\theta th2$ is set to a value smaller than the maximum value (a peak value) of the absolute value of the deviation $\Delta\theta$ that increases due to the fact that the thin paper (the sheet) that is being conveyed by the sheet discharge roller 319 comes out of the nip portion of the fixing roller 331. More specifically, when the absolute value of the deviation $\Delta\theta$ becomes greater than or equal to the threshold $\Delta\theta th2$, it means that the rear end of the sheet has passed through (come out of) the nip portion of the fixing roller 331.

If the signal indicating that the rear end of the sheet has come out of the nip portion of the fixing roller 331 is output from the sheet detector 700 (the time t6), the CPU 151*a* controls the motor M6 such that the peripheral velocity of the sheet discharge roller 319 becomes VP4'. The peripheral velocity VP4' is, for example, a value half as large again as the peripheral velocity VP4.

Then, the driving of the sheet discharge roller 319 is stopped at timing determined in advance based on the operation sequence.

Figure 18:
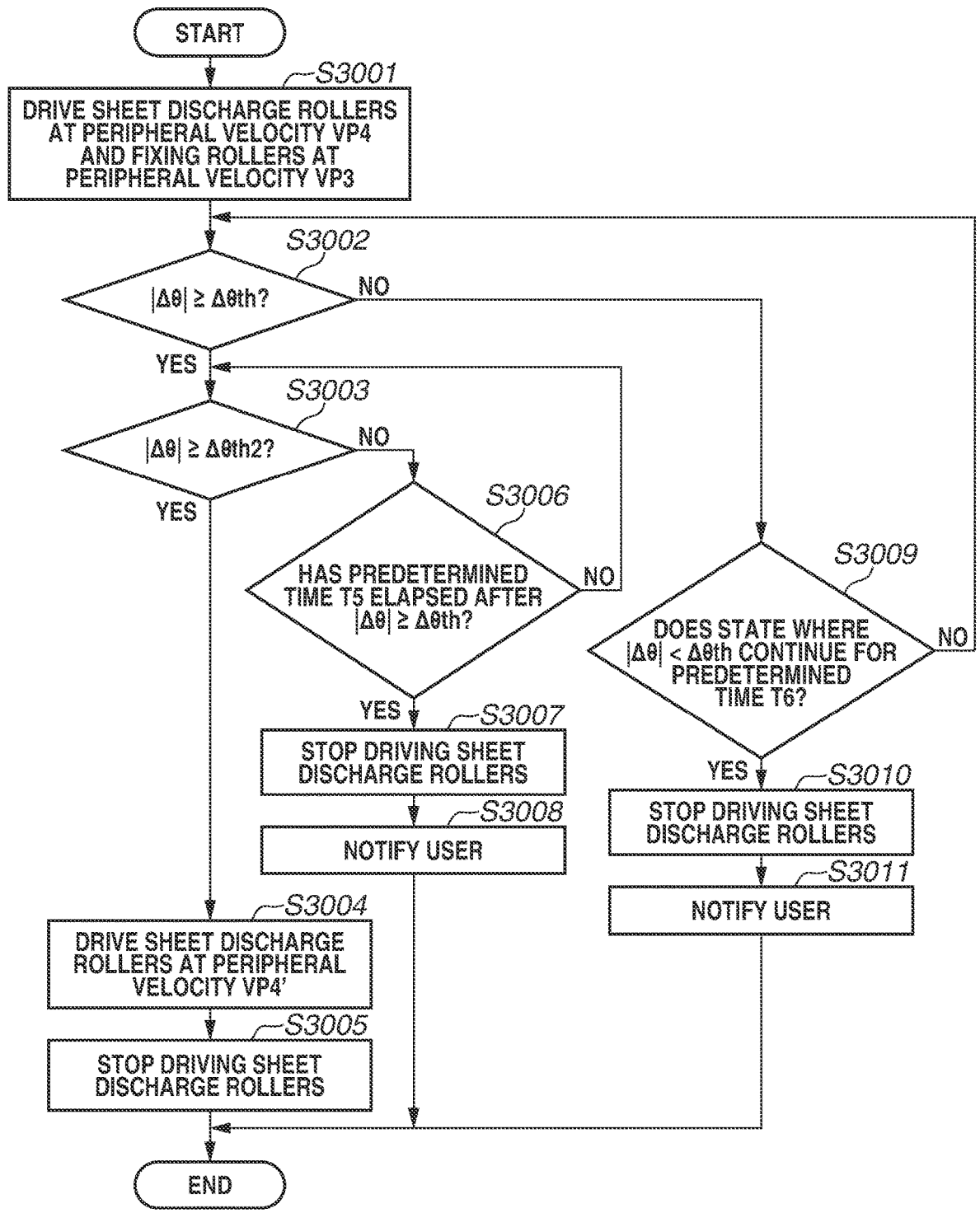
FIG. 18 is a flowchart illustrating a control method for controlling the sheet discharge roller.

FIG. 18 is a flowchart illustrating a control method for controlling the sheet discharge roller 319. With reference to FIG. 18, the control of the sheet discharge roller 319 according to the present embodiment is described below. The processing of the flowchart is executed by the CPU 151*a*.

First, if the CPU 151*a* outputs an enable signal indicating 'H' to the motor control device 164, then based on an instruction output from the CPU 151*a*, the motor control device 164 starts driving the motor M6. Consequently, the driving of the sheet discharge roller 319 is started. The enable signal is a signal permitting or prohibiting the operation of the motor control device 164. If the enable signal is 'L' (a low level), the CPU 151*a* prohibits the operation of the motor control device 164. That is, the control of the motor M6 by the motor control device 164 is ended. If the enable signal is 'H (a high level)', the CPU 151*a* permits the operation of the motor control device 164, and based on an instruction output from the CPU 151*a*, the motor control device 164 controls the motor M6.

Next, in step S3001, the CPU 151*a* outputs to the motor control device 165 an instruction to control the motor M5 such that the fixing roller 331 rotate at the peripheral velocity VP3. Consequently, the motor control device 165 controls the motor M5 such that the fixing roller 331 rotate at the peripheral velocity VP3. Further, the CPU 151*a* outputs to the motor control device 164 an instruction to control the motor M6 such that the sheet discharge roller 319 rotate at the peripheral velocity VP4, which is greater by $\Delta V'$ than the peripheral velocity VP3 of the fixing roller 331. Consequently, the motor control device 164 controls the motor M6 such that the sheet discharge roller 319 rotate at the peripheral velocity VP4.

In step S3002, if the absolute value of the deviation $\Delta\theta$ is greater than or equal to the threshold $\Delta\theta$th, i.e., if a signal indicating that the front end of the sheet has reached the nip portion of the sheet discharge roller 319 is output from the sheet detector 700 to the CPU 151*a* (YES in step S3002), the processing proceeds to step S3003.

In step S3003, if the absolute value of the deviation $\Delta\theta$ is greater than or equal to the threshold $\Delta\theta$th2, i.e., if a signal indicating that the rear end of the sheet has come out of the nip portion of the fixing roller 331 is output from the sheet detector 700 to the CPU 151*a* (YES in step S3003), the processing proceeds to step S3004.

Then, in step S3004, the CPU 151*a* outputs to the motor control device 164 an instruction to control the motor M6 such that the sheet discharge roller 319 rotate at the peripheral velocity VP4'. Consequently, the motor control device 164 controls the motor M6 such that the sheet discharge roller 319 rotate at the peripheral velocity VP4'.

Then, in step S3005, at predetermined timing set in advance based on the operation sequence of the image forming apparatus 100, the CPU 151*a* controls the motor control device 164 to stop driving the motor M6. Consequently, the motor control device 164 stops driving the motor M6. The predetermined timing is, for example, timing after the rear end of a preceding sheet comes out of the nip portion of the sheet discharge roller 319 and before the front end of a sheet conveyed subsequent to the preceding sheet reaches the nip portion of the sheet discharge roller 319.

Further, in step S3003, if the absolute value of the deviation $\Delta\theta$ is smaller than the threshold $\Delta\theta$th2, i.e., if a signal indicating that the rear end of the sheet has not come out of the nip portion of the fixing roller 331 is output from the sheet detector 700 to the CPU 151*a* (NO in step S3003), the processing proceeds to step S3006.

In step S3006, if the predetermined time T3 has not elapsed after the absolute value of the deviation $\Delta\theta$ becomes greater than or equal to the threshold $\Delta\theta$th in step S3002 (NO in step S3006), the processing returns to step S1003.

Further, in step S3006, if a predetermined time T5 has elapsed while the absolute value of the deviation $\Delta\theta$ has not become greater than or equal to the threshold $\Delta\theta$th2 after the absolute value of the deviation $\Delta\theta$ has become greater than or equal to the threshold $\Delta\theta$th in step S3002 (YES in step S3006), then in step S3007, the CPU 151*a* stops the driving of the sheet discharge roller 319 (the conveyance of the sheet). Alternatively, the apparatus may be configured such that in step S3006, if the state where the absolute value of the deviation $\Delta\theta$ is less than the threshold $\Delta\theta$th2 continues for the predetermined time T5 after the absolute value of the deviation $\Delta\theta$ has become greater than or equal to the threshold $\Delta\theta$th, then in step S3007, the CPU 151*a* stops the driving of the sheet discharge roller 319 (the conveyance of the sheet). The predetermined time T5 is set to a time shorter than the time required from when the absolute value of the deviation $\Delta\theta$ becomes greater than or equal to the threshold $\Delta\theta$th until when the driving of the motor M6 is stopped in step S3005. Further, the predetermined time T5 is set to a time longer than the time required from when the absolute value of the deviation $\Delta\theta$ becomes greater than or equal to the threshold $\Delta\theta$th until when the sheet comes out of the nip portion of the fixing roller 331.

Then, in step S3008, the CPU 151*a* indicates on the display unit provided in the operation unit 152 that an abnormal situation (e.g., a jam) has occurred in conveying the sheet to notify the user of the state. As described above, it is determined whether the predetermined time T5 has elapsed after the absolute value of the deviation $\Delta\theta$ has become greater than or equal to the threshold $\Delta\theta$th in step S3002, whereby it is possible to detect whether the sheet is normally conveyed between the fixing roller 331 and the sheet discharge roller 319.

Further, in step S3002, if the absolute value of the deviation $\Delta\theta$ is less than the threshold $\Delta\theta$th, i.e., if a signal indicating that the front end of the sheet has not reached the nip portion of the sheet discharge roller 319 is output from the sheet detector 700 to the CPU 151*a* (NO in step S3002), the processing proceeds to step S3009.

In step S3009, if a predetermined time T6 has not elapsed after the driving of the sheet discharge roller 319 is started (after the driving of the motor M6 is started), the processing returns to step S3002.

Further, in step S3009, if the predetermined time T6 has elapsed while the absolute value of the deviation $\Delta\theta$ has not become greater than or equal to the threshold $\Delta\theta$th after the driving of the sheet discharge roller 319 is started (YES in step S3009), then in step S3010, the CPU 151*a* stops the driving of the sheet discharge roller 319. The predetermined time T6 is set to a time shorter than the time required from when the driving of the sheet discharge roller 319 is started until when the driving of the motor M2 is stopped in step S3005. Further, the predetermined time T6 is set to a time longer than the time required from when the driving of the sheet discharge roller 319 is started until when the sheet reaches the nip portion of the sheet discharge roller 319.

Then, in step S3011, the CPU 151*a* indicates on the display unit provided in the operation unit 152 that an abnormal situation (e.g., a jam) has occurred in the conveyance of the sheet to notify the user of the state. Thus, it is determined whether the predetermined time T6 has elapsed after the driving of the sheet discharge roller 319 is started, whereby it is possible to detect whether the sheet is normally conveyed.

As described above, in the present embodiment, the peripheral velocity of the sheet discharge roller 319 is set to a velocity greater than that of the fixing roller 331 by ΔV'. Consequently, it is possible to make larger the fluctuation range of the load torque applied to the sheet discharge roller 319. That is, it is possible to make the fluctuation range of the deviation Δθ larger. Consequently, it is possible to detect that the rear end of the sheet has come out of the nip portion of the fixing roller 331, with higher accuracy than in a case where the fixing roller 331 and the sheet discharge roller 319 rotate at the same velocity. The peripheral velocity difference ΔV' is set to a value such that even if the sheet discharge roller 319 slip on the surface of the sheet conveyed by the fixing roller 331 rotating at the peripheral velocity V3, the surface of the sheet is not damaged, or an image fixed to the sheet is not damaged.

As described above, in the present embodiment, in the state where the sheet discharge roller 319 rotate at a peripheral velocity greater than that of the fixing roller 331, based on the deviation Δθ, it is detected that the rear end of the sheet has come out of the nip portion of the fixing roller 331. Then, if it is detected that the rear end of the sheet has come out of the nip portion of the fixing roller 331, the CPU 151a controls the motor control device 164 such that the peripheral velocity of the sheet discharge roller 319 changes from VP4 to VP4'. More specifically, if it is detected that the rear end of the sheet has come out of the nip portion of the fixing roller 331, the CPU 151a speeds up the peripheral velocity of the sheet discharge roller 319. Consequently, it is possible to speed up the peripheral velocity of sheet discharge roller at timing closest possible to the timing when the rear end of a sheet actually passes through a nip portion of fixing roller, than in a case where the peripheral velocity of the sheet discharge roller is sped up based on the detection result of a sensor such as a photosensor. Consequently, it is possible to prevent a decrease in the productivity of an image forming apparatus.

The configuration for detecting that the rear end of a sheet comes out of a nip portion of roller is not applied to the fixing roller 331 and the sheet discharge roller 319 only. For example, the configuration for detecting that the rear end of a sheet comes out of a nip portion of roller can be applied to two adjacent (adjoining) pairs of conveying rollers such as the conveying roller 306 and 307.

Further, in the present embodiment, the difference in peripheral velocity ΔV' is set to a predetermined value, regardless of the type of the sheet (the sheet type) that is conveyed. The present disclosure, however, is not limited to this. For example, the peripheral velocity difference ΔV' may be set according to the sheet type set by the user. A peripheral velocity difference ΔV' corresponding to thick paper may be smaller than the peripheral velocity difference ΔV' corresponding to thin paper and the peripheral velocity difference ΔV' corresponding to plain paper. Further, the peripheral velocity difference ΔV' corresponding to the plain paper may be smaller than the peripheral velocity difference ΔV' corresponding to the thin paper.

Further, in the present embodiment, the time t4 when the driving of the sheet discharge roller 319 is started is determined in advance based on the operation sequence of the image forming apparatus 100. The present disclosure, however, is not limited to this. For example, the apparatus may be configured such that if it is detected by the above method that the front end of the sheet has reached the nip portion of the fixing roller 331, the driving of the sheet discharge roller 319 is started. Alternatively, the apparatus may be configured such that based on the number of pulses output from the CPU 151a to the motor control device 164, the driving of the sheet discharge roller 319 is started.

Further, in the present embodiment, if the rear end of the sheet passes through the nip portion of the fixing roller 331, the driving of the sheet discharge roller 319 is stopped. The present disclosure, however, is not limited to this. For example, the apparatus may be configured such that based on the number of pulses output from the CPU 151a to the motor control device 164, the driving of the sheet discharge roller 319 is stopped.

Figure 19:
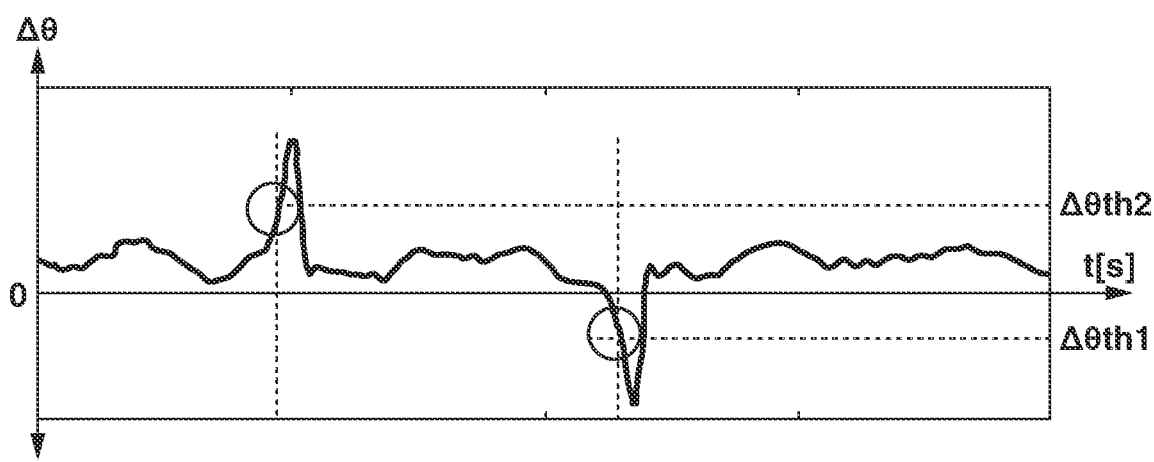
FIG. 19 is a diagram illustrating a deviation $\Delta\theta$ in a motor for driving conveying roller on the upstream side rotating at a peripheral velocity which is slower than downstream conveying roller.

Further, in the present embodiment, the sheet is detected based on the deviation Δθ in the motor for driving the downstream conveying roller at a peripheral velocity greater than that of the upstream conveying roller. The present disclosure, however, is not limited to this. For example, the sheet may be detected based on the deviation Δθ in the motor for driving the upstream conveying roller at a peripheral velocity slower than that of the downstream conveying roller. When the rear end of the sheet comes out of the nip portion of the upstream conveying roller in the state where the peripheral velocity of the downstream conveying roller is greater than that of the upstream conveying roller, a load torque applied to the motor for driving the upstream conveying roller increases. This is because a load torque applied to the upstream motor when the conveying roller rotate in the state where the sheet is not nipped by the upstream conveying roller is greater than a load torque applied to the upstream motor when the sheet nipped by the upstream conveying roller is pulled by the downstream conveying roller. Thus, in the state where the peripheral velocity of the downstream conveying roller is greater than that of the upstream conveying roller, the deviation Δθ in the motor for driving the upstream conveying roller changes as illustrated in FIG. 19. The change in the deviation Δθ illustrated in FIG. 19 is merely an example, and is not limited to this. For example, the fluctuation range of the deviation Δθ is not necessarily the same as that of the deviation Δθ in the downstream motor. In FIG. 19, the deviation Δθ having a negative value indicates that the rotational phase θ is behind the instruction phase θ_ref. and the deviation Δθ having a positive value indicates that the rotational phase θ is ahead of the instruction phase θ_ref. However, the relationships between the polarity of the deviation Δθ, and the rotational phase θ and the instruction phase θ_ref are not limited to these. For example, the apparatus may be configured such that in a case where the rotational phase θ is behind the instruction phase θ_ref, the deviation Δθ has a positive value, and in a case where the rotational phase θ is ahead of the instruction phase θ_ref, the deviation Δθ has a negative value.

Further, in the present embodiment, the CPU 151a controls the driving of the conveying roller such that the peripheral velocity of the conveying roller on the downstream side in the conveying direction becomes greater than that of the conveying roller on the upstream side in the conveying direction. The present disclosure, however, is not limited to this. For example, the conveying roller may be controlled such that the peripheral velocity of the downstream conveying roller becomes slower than that of the upstream conveying roller. In this case, if the front end of the sheet reaches the nip portion of the downstream conveying roller, the sheet bends between the upstream and downstream conveying roller due to the fact that the upstream conveying roller are faster than the downstream conveying roller. Consequently, an elastic force acts on the sheet. Due to the elastic force, a force in a direction opposite to the rotational direction acts on the upstream conveying roller.

Consequently, the load torque applied to the motor for driving the upstream conveying roller increases. Further, when the rear end of the sheet comes out of the nip portion of the upstream conveying roller, the force in the direction opposite to the rotational direction due to the elastic force disappears. Thus, the load torque applied to the motor for driving the upstream conveying roller decreases. More specifically, due to the elastic force, the deviation $\Delta\theta$ in the motor for driving the upstream conveying roller fluctuates as illustrated in FIG. 17, for example. Further, when the rear end of the sheet comes out of the nip portion of the upstream conveying roller, a force in the rotational direction which comes from the elastic force becomes small. Accordingly, a load torque applied to the motor for driving the downstream conveying roller increases. As described above, in the state where the conveying roller are controlled such that the peripheral velocity of the downstream conveying roller is slower than that of the upstream conveying roller, the sheet may be detected based on the deviation $\Delta\theta$ in the motor for driving the upstream or downstream conveying roller.

In the first to third embodiments, the threshold for the deviation $\Delta\theta$ is a predetermined value regardless of the sheet type. Alternatively, the threshold may be set for each sheet type.

Further, the apparatus may be configured such that the CPU 151a has the function of the sheet detector 700 according to the first to third embodiments.

Furthermore, in the first to third embodiments, the sheet is detected by comparing the absolute value of the deviation $\Delta\theta$ with the threshold $\Delta\theta$th. The present disclosure, however, is not limited to this. For example, the sheet may be detected by comparing the current value iq output from the coordinate converter 511 with a threshold iqth. The increase of the current value iq means increase of the load torque applied to the rotor of the motor. The decrease of the current value iq means decrease of the load torque applied to the rotor of the motor.

Further, the sheet may be detected by comparing the q-axis current instruction value (target value) iq_ref with a threshold iq_refth, which is determined based on the deviation between the instruction phase $\theta$_ref and the rotational phase $\theta$ determined by the phase determiner 513. The increase of the q-axis current instruction value iq_ref means increase of a torque required for the rotation of the rotor of the motor due to increase in the load torque applied to the rotor. The decrease of the q-axis current instruction value iq_ref means decrease of the torque required for the rotation of the rotor of the motor due to decrease in the load torque applied to the rotor.

Further, the apparatus may be configured such that the sheet is detected by comparing the amplitude (magnitude) of the current value i$\alpha$ or i$\beta$ in the stationary coordinate system with a threshold. The increase of the amplitude (magnitude) of the current value i$\alpha$ or i$\beta$ in the stationary coordinate system means increase of the load torque applied to the rotor of the motor. The decrease of the amplitude means decrease of the load torque applied to the rotor of the motor.

Further, in the first to third embodiments, the rotational velocity of the motor for driving the downstream conveying roller is controlled to differentiate the peripheral velocities of the downstream and upstream conveying roller. The present disclosure, however, is not limited to this. For example, the rotational velocity of the motor for driving the upstream conveying roller may be controlled to differentiate the peripheral velocities of the downstream and upstream conveying roller. Alternatively, the rotational velocities of both the motor for driving the upstream conveying roller and the motor for driving the downstream conveying roller may be controlled to differentiate the peripheral velocities of the downstream and upstream conveying roller.

The first to third embodiments are not applied to motor control by vector control only. For example, the first to third embodiments can be applied to any motor control device having a configuration for feeding back a rotational phase or a rotational velocity.

Further, in the first to third embodiments, a stepping motor is used as a motor for driving a load. Alternatively, another motor such as a direct current (DC) motor may be used. Further, the motor is not limited to a two-phase motor. The present embodiment can also be applied to another motor such as a three-phase motor.

Figure 20:
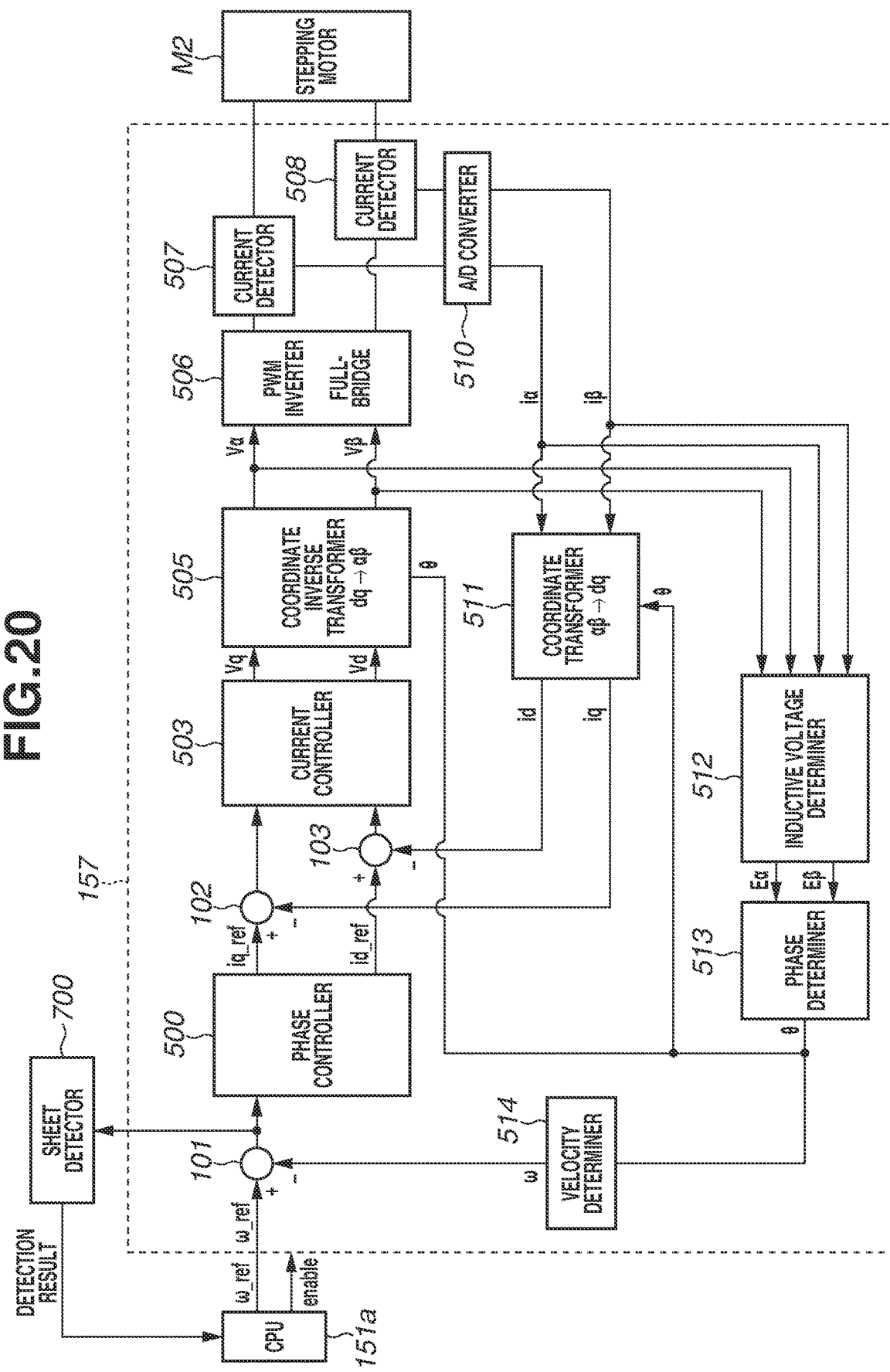
FIG. 20 is a block diagram illustrating a configuration of a motor control device for performing velocity feedback control.

Further, in the vector control according to the first to third embodiments, the motor is controlled by performing phase feedback control. The present disclosure, however, is not limited to this. For example, the apparatus may be configured such that the motor is controlled by feeding back a rotational velocity $\omega$ of the rotor 402. Specifically, as illustrated in FIG. 20, a velocity determiner 514 is provided within the motor control device 157, and based on a change amount of the rotational phase $\theta$ output from the phase determiner 513 in a predetermined period, the velocity determiner 514 determines the rotational velocity $\omega$. The velocity is determined using the following formula (10).

$$\omega = d\theta/dt \quad (10)$$

Then, the CPU 151a outputs an instruction velocity $\omega$_ref, which indicates a target velocity of the rotor 402. Further, the apparatus may be configured such that a velocity controller 500 is provided within the motor control device 157. The velocity controller 500 generates the q-axis current instruction value iq_ref and the d-axis current instruction value id_ref in such a manner that the deviation between the rotational velocity $\omega$ and the instruction velocity $\omega$_ref is reduced. Then, the velocity controller 500 outputs the q-axis current instruction value iq_ref and the d-axis current instruction value id_ref. The apparatus may be configured such that the motor is controlled by performing such velocity feedback control. In such a configuration, the sheet is detected by the methods described in the first to third embodiments, for example, based on a deviation $\Delta\omega$ between the rotational velocity $\omega$ and the instruction velocity $\omega$_ref. The instruction velocity $\omega$_ref is a target velocity of the rotor 402 of the motor M2 which corresponds to a target velocity of the peripheral velocity of the conveying roller 306.

The deviations $\Delta\theta$ and $\Delta\omega$, the current value iq, the current value iq_ref, and the amplitude of the current value i$\alpha$ or i$\beta$ in the stationary coordinate system correspond to the values of parameters corresponding to the load torque applied to the rotor of the motor. The values of the parameters corresponding to the load torque change when the sheet is conveyed by adjacent (adjoining) pairs of conveying rollers.

In the first and second embodiments, a permanent magnet is used as the rotor. The present disclosure, however, is not limited to this.

The photosensitive drum 309, the developing device 314, and the transfer charging device 315 are included in an image forming unit.

Further, the apparatus may be configured such that the sheet detector 700 detects at least one of whether the front end of a sheet has reached a nip portion of conveying roller, and whether the rear end of the sheet has come out of a nip portion of conveying roller.

Further, the configuration for detecting a sheet can be also applied to, for example, a motor for rotary-driving a conveying belt. That is, the configuration for detecting a sheet can be applied to a motor for rotary-driving a rotating member, such as a roller or a conveying belt.

According to the present disclosure, it is possible to detect with high accuracy a sheet that is conveyed.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Applications No. 2017-108244, filed May 31, 2017, No. 2017-167248, filed Aug. 31, 2017, and No. 2018-037686, filed Mar. 2, 2018, which are hereby incorporated by reference herein in their entirety.

What is claimed is:

1. A sheet conveying apparatus for conveying a sheet, the sheet conveying apparatus comprising:
a first conveying roller configured to convey the sheet;
a second conveying roller adjoining the first conveying roller;
a motor configured to drive the first conveying roller;
a velocity determiner configured to determine a rotational velocity of a rotor of the motor;
a controller configured to control a drive current flowing through a winding of the motor such that a deviation between an instruction velocity indicating a target velocity of the rotor and the rotational velocity determined by the velocity determiner is reduced; and
a discriminator configured to execute discrimination with respect to at least one of whether a front end of the sheet has reached a nip portion of a downstream conveying roller which is on a downstream side of the first and second conveying rollers in a conveying direction in which the sheet is conveyed, or whether a rear end of the sheet has passed through a nip portion of an upstream conveying roller which is on an upstream side of the first and second conveying rollers in the conveying direction,
wherein the controller controls the drive current flowing through the winding of the motor such that the first conveying roller rotates at a first peripheral velocity which is different from a second peripheral velocity of the second conveying roller, and
wherein the discriminator executes the discrimination based on a value of a parameter corresponding to a load torque applied to the rotor in a state where the first conveying roller rotates at the first peripheral velocity which is different from the second peripheral velocity.

2. The sheet conveying apparatus according to claim 1, wherein the controller controls the drive current based on a torque current component, that is represented in a rotating coordinate system based on the rotational velocity determined by the velocity determiner, and generates a torque in the rotor, and
wherein the parameter corresponding to the load torque is a value of the torque current component.

3. The sheet conveying apparatus according to claim 1, wherein, in a case where an absolute value of the value of the parameter corresponding to the load torque becomes greater than a first predetermined value, the discriminator discriminates that the front end of the sheet has reached the nip portion of the downstream conveying roller.

4. The sheet conveying apparatus according to claim 3, wherein, in a case where a state where the discriminator does not discriminate that the front end of the sheet has reached the nip portion of the downstream conveying roller continues for a first predetermined time, the controller controls to stop the conveyance of the sheet.

5. The sheet conveying apparatus according to claim 3, further comprising a notification unit,
wherein, in a case where a state where the discriminator does not discriminate that the front end of the sheet has reached the nip portion of the downstream conveying roller continues for a second predetermined time, the notification unit gives a notification that an abnormal situation has occurred in conveying the sheet.

6. The sheet conveying apparatus according to claim 1, wherein, in a case where an absolute value of the value of the parameter corresponding to the load torque becomes greater than a second predetermined value, the discriminator discriminates that the rear end of the sheet has passed through the nip portion of the upstream conveying roller.

7. The sheet conveying apparatus according to claim 6, wherein, in a case where a state where the discriminator does not discriminate that the rear end of the sheet has passed through the nip portion of the upstream conveying roller continues for a third predetermined time, the controller controls to stop driving the motor.

8. The sheet conveying apparatus according to claim 6, further comprising a notification unit,
wherein, in a case where a state where the discriminator does not discriminate that the rear end of the sheet has passed through the nip portion of the upstream conveying roller continues for a third predetermined time, the notification unit gives a notification that an abnormal situation has occurred in conveying the sheet.

9. The sheet conveying apparatus according to claim 1, wherein the controller controls the motor such that the downstream conveying roller rotates at a peripheral velocity greater than a peripheral velocity of the upstream conveying roller.

10. The sheet conveying apparatus according to claim 1, further comprising an acquisition unit configured to acquire information indicating a type of the sheet that is conveyed,
wherein a difference between the first peripheral velocity and the second peripheral velocity is set according to the acquired information indicating the type of the sheet.

11. The sheet conveying apparatus according to claim 1, wherein the parameter corresponding to the load torque is the deviation.

12. The sheet conveying apparatus according to claim 1, further comprising a detector configured to detect the drive current flowing through the winding of the motor,
wherein the controller controls the drive current based on a torque current component, that is represented in a rotating coordinate system based on the rotational velocity determined by the velocity determiner, and generates a torque in the rotor, and
wherein the parameter corresponding to the load torque is a value of the torque current component of the drive current detected by the detector.

13. The sheet conveying apparatus according to claim 1, wherein the motor is a first motor, the velocity determiner is a first velocity determiner, the controller is a first controller, the deviation is a first deviation, and the discriminator is a first discriminator, the sheet conveying apparatus further comprising:

a storing tray configured to store the sheet;
a pickup roller configured to feed the sheet store in the storing tray;
a feed roller configured to convey the sheet fed by the pickup roller to a downstream side of the feed roller;
a sheet detection unit provided between the pickup roller and the feed roller in the conveying direction and configured to detect the sheet;
a second motor configured to drive the feed roller;
a second velocity determiner configured to determine a rotational velocity of a rotor of the second motor;
a second controller configured to control a drive current flowing through a winding of the second motor such that a second deviation between an instruction velocity indicating a target velocity of the rotor of the second motor and the rotational velocity determined by the second velocity determiner is reduced;
a storage unit configured to store information indicating a relationship between the second deviation and a type of the sheet; and
a second discriminator configured to discriminate the type of the sheet that is conveyed based on the information stored in the storage unit and the second deviation.

14. The sheet conveying apparatus according to claim 1, further comprising a phase determiner configured to determine a rotational phase of the rotor of the motor,
wherein the controller controls the drive current based on a torque current component, that is represented in a rotating coordinate system based on the rotational phase determined by the phase determiner, and generates a torque in the rotor.

15. A sheet conveying apparatus for conveying a sheet, the sheet conveying apparatus comprising:
a first conveying roller configured to convey the sheet;
a second conveying roller adjoining the first conveying roller;
a motor configured to drive the first conveying roller;
a phase determiner configured to determine a rotational phase of a rotor of the motor;
a controller configured to control a drive current flowing through a winding of the motor such that a deviation between an instruction phase indicating a target phase of the rotor and the rotational phase determined by the phase determiner is reduced; and
a discriminator configured to execute discrimination with respect to at least one of whether a front end of the sheet has reached a nip portion of a downstream conveying roller which is on a downstream side of the first and second conveying rollers in a conveying direction in which the sheet is conveyed, or whether a rear end of the sheet has passed through a nip portion of an upstream conveying roller which is on an upstream side of the first and second conveying rollers in the conveying direction,
wherein the controller controls the drive current flowing through the winding of the motor such that the first conveying roller rotates at a first peripheral velocity which is different from a second peripheral velocity of the second conveying roller, and
wherein the discriminator executes the discrimination based on a value of a parameter corresponding to a load torque applied to the rotor in a state where the first conveying roller rotates at the first peripheral velocity which is different from the second peripheral velocity of the second conveying roller.

16. The sheet conveying apparatus according to claim 15, wherein, in a case where an absolute value of the value of the parameter corresponding to the load torque becomes greater than a first predetermined value, the discriminator discriminates that the front end of the sheet has reached the nip portion of the downstream conveying roller.

17. The sheet conveying apparatus according to claim 16, wherein, in a case where a state where the discriminator does not discriminate that the front end of the sheet has reached the nip portion of the downstream conveying roller continues for a first predetermined time, the controller controls to stop the conveyance of the sheet.

18. The sheet conveying apparatus according to claim 16, further comprising a notification unit,
wherein, in a case where a state where the discriminator does not discriminate that the front end of the sheet has reached the nip portion of the downstream conveying roller continues for the first predetermined time, the notification unit gives a notification that an abnormal situation has occurred in conveying the sheet.

19. The sheet conveying apparatus according to claim 15, wherein, in a case where an absolute value of the value of the parameter corresponding to the load torque becomes greater than a second predetermined value, the discriminator discriminates that the rear end of the sheet has passed through the nip portion of the upstream conveying roller.

20. The sheet conveying apparatus according to claim 19, wherein, in a case where a state where the discriminator does not discriminate that the rear end of the sheet has passed through the nip portion of the upstream conveying roller continues for a second predetermined time, the controller controls to stop driving the motor.

21. The sheet conveying apparatus according to claim 19, further comprising a notification unit,
wherein, in a case where a state where the discriminator does not discriminate that the rear end of the sheet has passed through the nip portion of the upstream conveying roller continues for the second predetermined time, the notification unit gives a notification that an abnormal situation has occurred in conveying the sheet.

22. The sheet conveying apparatus according to claim 15, wherein the controller controls the motor such that the downstream conveying roller rotates at a peripheral velocity greater than a peripheral velocity of the upstream conveying roller.

23. The sheet conveying apparatus according to claim 15, further comprising an acquisition unit configured to acquire information indicating a type of the sheet that is conveyed,
wherein a difference between the first peripheral velocity and the second peripheral velocity is set according to the acquired information indicating the type of the sheet.

24. The sheet conveying apparatus according to claim 15, wherein the parameter corresponding to the load torque is the deviation.

25. The sheet conveying apparatus according to claim 15, further comprising a detector configured to detect the drive current flowing through the winding of the motor,
wherein the controller component, that is represented in a rotating coordinate system based on the rotational phase determined by the phase determiner, and generates a torque in the rotor, and
wherein the parameter corresponding to the load torque is a value of the torque current component of the drive current detected by the detector.

26. The sheet conveying apparatus according to claim 1, wherein the controller controls the drive current based on a torque current component, that is represented in a rotating coordinate system based on the rotational phase determined by the phase determiner, and generates a torque in the rotor.

27. The sheet conveying apparatus according to claim 15, wherein the motor is a first motor, the phase determiner is a first phase determiner, the controller is a first controller, the deviation is a first deviation, and the discriminator is a first discriminator, the sheet conveying apparatus further comprising:
a storing tray configured to store the sheet;
a pickup roller configured to feed the sheet stored in the storing tray;
a feed roller configured to convey the sheet fed by the pickup roller to a downstream side of the feed roller;
a sheet detection unit provided between the pickup roller and the feed roller in the conveying direction and configured to detect the sheet;
a second motor configured to drive the feed roller;
a second phase determiner configured to determine a rotational phase of a rotor of the second motor;
a second controller configured to control a drive current flowing through a winding of the second motor such that a second deviation between an instruction phase indicating a target phase of the rotor of the second motor and the rotational phase determined by the second phase determiner is reduced;
a storage unit configured to store information indicating a relationship between the second deviation and a type of the sheet; and
a second discriminator configured to discriminate the type of the sheet that is conveyed based on the information stored in the storage unit and the second deviation.

28. A sheet conveying apparatus apparatus, for conveying a sheet, the sheet conveying apparatus comprising:
a first conveying roller configured to convey the sheet;
a second conveying roller adjoining the first conveying roller;
a motor configured to drive the first conveying roller;
a phase determiner configured to determine a rotational phase of a rotor of the motor;
a controller configured to control a drive current flowing through a winding of the motor such that a deviation between an instruction phase indicating a target phase of the rotor and the rotational phase determined by the phase determiner is reduced; and
a discriminator configured to output, in a case where an absolute value of a parameter corresponding to a load torque applied to the rotor is greater than a predetermined value, a signal indicating that a front end of the sheet has reached a nip portion of a downstream conveying roller which is on a downstream side of the first and second conveying rollers in a conveying direction in which the sheet is conveyed,
wherein, in a period from when the front end of the sheet has reached a predetermined position upstream of the nip portion of the downstream conveying roller in the conveying direction until when the signal indicating that the front end of the sheet has reached the nip portion of the downstream conveying roller is output from the discriminator, the controller controls the motor such that the first conveying roller rotates at a peripheral velocity which is different from a peripheral velocity of the second conveying roller, and
wherein the controller controls the motor such that a difference between the first and second peripheral velocities after the signal indicating that the front end of the sheet has reached the nip portion of the downstream conveying roller is output from the discriminator, is smaller than the difference between the first and second peripheral velocities in the period.

29. A sheet conveying apparatus, for conveying a sheet, the sheet conveying apparatus comprising:
a first conveying roller configured to convey the sheet;
a second conveying roller adjoining the first conveying roller;
a motor configured to drive the first conveying roller;
a velocity determiner configured to determine a rotational velocity of a rotor of the motor;
a controller configured to control a drive current flowing through a winding of the motor such that a deviation between an instruction velocity indicating a target velocity of the rotor and the rotational velocity determined by the velocity determiner is reduced; and
a discriminator configured to output, in a case where an absolute value of a parameter corresponding to a load torque applied to the rotor is greater than a predetermined value, a signal indicating that a front end of the sheet has reached a nip portion of a downstream conveying roller which is on a downstream side of the first and second conveying rollers in a conveying direction in which the sheet is conveyed,
wherein, in a period from when the front end of the sheet has reached a predetermined position upstream of the nip portion of the downstream conveying roller in the conveying direction until when the signal indicating that the front end of the sheet has reached the nip portion of the downstream conveying roller is output from the discriminator, the controller controls the motor such that the first conveying roller rotates at a first peripheral velocity which is different from a second peripheral velocity of the second conveying roller, and
wherein the controller controls the motor such that a difference between the first and second peripheral velocities after the signal indicating that the front end of the sheet has reached the nip portion of the downstream conveying roller is output from the discriminator, is smaller than the difference between the first and second peripheral velocities in the period.

30. The sheet conveying apparatus according to claim 29, wherein the first conveying roller is provided downstream of the second conveying roller in the conveying direction, and the first peripheral velocity is greater than the second peripheral velocity, and
wherein, after the signal indicating that the front end of the sheet has reached the nip portion of the downstream conveying roller is output from the discriminator, the controller controls the motor such that the first conveying roller rotates at a third peripheral velocity which is slower than the first peripheral velocity.

31. The sheet conveying apparatus according to claim 30, wherein the third peripheral velocity is equal to the second peripheral velocity.

32. The sheet conveying apparatus according to claim 22, wherein, in a period from when the front end of the sheet has reached the predetermined position until when a predetermined time elapses after the signal indicating that the front end of the sheet has reached the nip portion of the downstream conveying roller is output from the discriminator, the controller controls the motor such that the first peripheral velocity is different from the second peripheral velocity, and
wherein, in the period from when the front end of the sheet reaches the predetermined position until when the predetermined time elapses, the controller controls the motor such that the difference between the first and second peripheral velocities after the predetermined time elapses is smaller than the difference between the first and second peripheral velocities.

33. An image forming apparatus for forming an image on a sheet, the image forming apparatus comprising:
an image forming unit configured to form the image on the sheet;
a fixing roller configured to fix, to the sheet, the image formed on the sheet by the image forming unit;
a conveying roller provided downstream of the fixing roller in a conveying direction in which the sheet is conveyed;
a motor configured to drive the conveying roller;
a phase determiner configured to determine a rotational phase of a rotor of the motor;
a controller configured to control a drive current flowing through a winding of the motor such that a deviation between an instruction phase indicating a target phase of the rotor and the rotational phase determined by the phase determiner is reduced; and
a discriminator configured to output, in a case where an absolute value of a parameter corresponding to a load torque applied to the rotor is greater than a predetermined value, a signal indicating that a rear end of the sheet has passed through a nip portion of the fixing roller,
wherein, in a period from when the driving of the conveying roller is started until when the signal indicating that the rear end of the sheet has passed through the nip portion of the fixing roller is output from the discriminator, the controller controls the drive current such that a peripheral velocity of the conveying roller becomes a first velocity which is greater than a peripheral velocity of the fixing roller, and
wherein, in a case where the signal indicating that the rear end of the sheet has passed through the nip portion of the fixing roller is output from the discriminator, the controller controls the drive current such that the peripheral velocity of the conveying roller becomes a second velocity which is greater than the first velocity.

34. An image forming apparatus for forming an image on a sheet, the image forming apparatus comprising:
an image forming unit configured to form the image on the sheet;
a fixing roller configured to fix, to the sheet, the image formed on the sheet by the image forming unit;
a conveying roller provided downstream of the fixing roller in a conveying direction in which the sheet is conveyed;
a motor configured to drive the conveying roller;
a velocity determiner configured to determine a rotational velocity of a rotor of the motor;
a controller configured to control a drive current flowing through a winding of the motor such that a deviation between an instruction velocity indicating a target velocity of the rotor and the rotational velocity determined by the velocity determiner is reduced; and
a discriminator configured to output, in a case where an absolute value of a parameter corresponding to a load torque applied to the rotor is greater than a predetermined value, a signal indicating that a rear end of the sheet has passed through a nip portion of the fixing roller,
wherein, in a period from when the driving of the conveying roller is started until when the signal indicating that the rear end of the sheet has passed through the nip portion of the fixing roller is output from the discriminator, the controller controls the drive current such that a peripheral velocity of the conveying roller becomes a first velocity which is greater than a peripheral velocity of the fixing roller, and
wherein, in a case where the signal indicating that the rear end of the sheet has passed through the nip portion of the fixing roller is output from the discriminator, the controller controls the drive current such that the peripheral velocity of the conveying roller becomes a second velocity which is greater than the first velocity.

35. A sheet conveying apparatus, comprising:
a storing tray configured to store the sheet;
a pickup roller configured to feed the sheet stored in the storing tray;
a feed roller adjoining the pickup roller and configured to convey the sheet fed by the pickup roller to a downstream side of the feed roller;
a conveying roller adjoining the feed roller and configured to convey the sheet conveyed by the feed roller further to the downstream side;
a motor configured to drive the conveying roller;
a phase determiner configured to determine a rotational phase of a rotor of the motor;
a controller configured to control a drive current flowing through a winding of the motor such that a deviation between an instruction phase indicating a target phase of the rotor and the rotational phase determined by the phase determiner is reduced; and
a discriminator configured to execute discrimination with respect to at least one of whether a front end of the sheet has reached a nip portion of the conveying roller, or whether a rear end of the sheet has passed through a nip portion of the feed roller,
wherein the controller controls the drive current flowing through the winding of the motor such that the conveying roller rotates at a first peripheral velocity which is greater than a peripheral velocity of the feed roller, and
wherein the discriminator executes the discrimination based on a value of a parameter corresponding to a load torque applied to the rotor in a state where the conveying roller rotates at the peripheral velocity which is greater than a peripheral velocity of the feed roller.

36. A sheet conveying apparatus, comprising:
a storing tray configured to store the sheet;
a pickup roller configured to feed the sheet stored in the storing tray;
a feed roller adjoining the pickup roller and configured to convey the sheet fed by the pickup roller to a downstream side of the feed roller;
a conveying roller adjoining the feed roller and configured to convey the sheet conveyed by the feed roller further to the downstream side;
a motor configured to drive the conveying roller;
a velocity determiner configured to determine a rotational velocity of a rotor of the motor;
a controller configured to control a drive current flowing through a winding of the motor such that a deviation between an instruction velocity indicating a target velocity of the rotor and the rotational velocity determined by the velocity determiner is reduced; and
a discriminator configured to execute discrimination with respect to at least one of whether a front end of the sheet has reached a nip portion of the conveying roller, or whether a rear end of the sheet has passed through a nip portion of the feed roller, wherein the controller controls the drive current flowing through the winding of the motor such that the conveying roller rotates at a peripheral velocity which is greater than a peripheral velocity of the feed roller, and wherein the discriminator executes the discrimination based on a value of a parameter corresponding to a load torque applied to the rotor in a state where the conveying roller rotates at the peripheral velocity which is greater than a peripheral velocity of the feed roller.

* * * * *